US012399607B1

United States Patent
Hanson et al.

(10) Patent No.: US 12,399,607 B1
(45) Date of Patent: Aug. 26, 2025

(54) COMPLEX ACTION PARAMETER SUPPORT IN A VISUAL PLAYBOOK EDITOR

(71) Applicant: Splunk Inc., San Francisco, CA (US)

(72) Inventors: Matthew Hanson, San Jose, CA (US); Jacob Davis, Campbell, CA (US); Zhi Peng Zhou, Vancouver (CA); James Harris, Maple (CA); Jacob Andrew Edward Moore, Burlington (CA); Austin Tyler Hariri, Windsor, CO (US); Shiying Tu, Burnaby (CA); Daniel Trenkner, Encinitas, CA (US); Kavita Varadarajan, Cupertino, CA (US)

(73) Assignee: SPLUNK Inc., San Francisco, CA (US)

( * ) Notice: Subject to any disclaimer, the term of this patent is extended or adjusted under 35 U.S.C. 154(b) by 273 days.

(21) Appl. No.: 18/326,862

(22) Filed: May 31, 2023

(51) Int. Cl.
*H04L 67/133* (2022.01)
*G06F 3/04842* (2022.01)
*G06F 8/34* (2018.01)
*G06F 9/30* (2018.01)
*G06F 9/445* (2018.01)
*G06F 9/455* (2018.01)
*G06F 21/56* (2013.01)
*H04L 67/125* (2022.01)

(52) U.S. Cl.
CPC ............ *G06F 3/04842* (2013.01); *G06F 8/34* (2013.01); *G06F 21/56* (2013.01)

(58) Field of Classification Search
CPC ........ G06F 3/04842; G06F 8/34; G06F 21/56; G06F 21/53; G06F 9/543; G06F 9/451; G06F 8/70; G06F 9/3017; G06F 8/71; H04L 63/101; H04L 63/1433; H04L 67/125; H04L 63/1425
See application file for complete search history.

(56) References Cited

U.S. PATENT DOCUMENTS

| 7,752,655 | B2 | 7/2010 | Ohto |
| 7,937,344 | B2 | 5/2011 | Baum et al. |
| 8,112,425 | B2 | 2/2012 | Baum et al. |
| 8,510,762 | B1 | 8/2013 | Gregorio et al. |
| 8,751,529 | B2 | 6/2014 | Zhang et al. |
| 8,788,525 | B2 | 7/2014 | Neels et al. |
| 9,215,240 | B2 | 12/2015 | Merza et al. |

(Continued)

OTHER PUBLICATIONS

Splunk Enterprise 8.0.0 Overview, available online, retrieved May 20, 2020 from docs.splunk.com.

(Continued)

*Primary Examiner* — Thuy Dao
(74) *Attorney, Agent, or Firm* — Kilpatrick Townsend & Stockton LLP

(57) ABSTRACT

Described herein are techniques are provided for enabling a security orchestration, automation, and response (SOAR) service to automatically manage apps used to interface with an integrated security operations service and other related devices and services. Further described herein is a SOAR app generator service or application used to automate the creation of apps for a SOAR service based on application programming interfaces (API) specifications for related devices or services, as well as visual playbook editor interfaces for a SOAR service that enable the configuration of complex action input parameters including arrays and objects.

20 Claims, 12 Drawing Sheets

(56) References Cited

U.S. PATENT DOCUMENTS

| | | | |
|---|---|---|---|
| 9,286,413 | B1 | 3/2016 | Coates et al. |
| 9,753,744 | B1 | 9/2017 | Wells et al. |
| 10,127,258 | B2 | 11/2018 | Lamas et al. |
| 10,545,730 | B2 | 1/2020 | McCune |
| 10,585,683 | B2 | 3/2020 | Wells et al. |
| 11,050,793 | B2 | 6/2021 | Jeyakumar et al. |
| 11,252,189 | B2 | 2/2022 | Reiser et al. |
| 11,269,694 | B2 | 3/2022 | Aspro et al. |
| 11,475,013 | B2 | 10/2022 | Parker |
| 11,563,755 | B2 * | 1/2023 | Narula .................. G06N 20/00 |
| 12,141,272 | B2 * | 11/2024 | Saliba .................. H04L 63/302 |
| 2019/0098106 | A1 | 3/2019 | Mungel et al. |
| 2019/0339947 | A1 | 11/2019 | McCune |
| 2021/0166227 | A1 | 6/2021 | Tiwari et al. |
| 2021/0297427 | A1 | 9/2021 | Narula et al. |
| 2021/0306352 | A1 | 9/2021 | Narula et al. |
| 2022/0070180 | A1 | 3/2022 | Friedrich |
| 2022/0075674 | A1 | 3/2022 | Miedema et al. |
| 2023/0068946 | A1 | 3/2023 | McCarthy et al. |
| 2023/0146804 | A1 | 5/2023 | Narula et al. |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carasso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Notice of Allowance, U.S. Appl. No. 18/326,830, Oct. 19, 2023, 10 pages.

* cited by examiner

700

```
OBTAINING, BY A SECURITY, ORCHESTRATION, AND AUTOMATED RESPONSE (SOAR)
SERVICE, AN IDENTIFIER OF AN APP FOR A DEVICE OR SERVICE RELATED TO THE SOAR
SERVICE, WHEREIN THE SOAR SERVICE AUTOMATES RESPONSES TO SECURITY AND
OPERATIONAL INCIDENTS OCCURRING IN INFORMATION TECHNOLOGY (IT)
ENVIRONMENTS, WHEREIN THE DEVICE OR SERVICE PROVIDES FUNCTIONALITY
EXECUTABLE BY THE SOAR SERVICE VIA AN APPLICATION PROGRAMMING INTERFACE
(API), AND WHEREIN THE APP IMPLEMENTS A CLIENT INTERFACE TO THE API PROVIDED BY
THE DEVICE OR SERVICE
702
```

↓

```
DETERMINING, BY THE SOAR SERVICE, THAT THE APP IS NOT INSTALLED IN ASSOCIATION
WITH THE SOAR SERVICE
704
```

↓

```
INSTALLING, BY THE SOAR SERVICE, THE APP BY: OBTAINING THE APP FROM AN APP
REPOSITORY, AND STORING THE APP AT A STORAGE LOCATION ACCESSIBLE TO THE SOAR
SERVICE
706
```

↓

```
RECEIVING, BY THE SOAR SERVICE, A REQUEST TO EXECUTE AN ACTION DEFINED BY THE
APP, WHEREIN THE ACTION CORRESPONDS TO AN ENDPOINT DEFINED BY THE API
PROVIDED BY THE DEVICE OR SERVICE
708
```

↓

```
SENDING, VIA THE CLIENT INTERFACE IMPLEMENTED BY THE APP, A REQUEST TO THE
ENDPOINT DEFINED BY THE API TO EXECUTE THE ACTION
710
```

↓

```
RECEIVING A RESULT FROM THE DEVICE OR SERVICE BASED ON EXECUTION OF THE
ACTION
712
```

```
┌─────────────────────────────────────────────────────────────────────────┐
│ RECEIVING, BY A VISUAL PLAYBOOK EDITOR INTERFACE OF A SECURITY,         │
│ ORCHESTRATION, AND AUTOMATED RESPONSE (SOAR) SERVICE, A REQUEST TO      │
│ ADD AN ACTION BLOCK TO A PLAYBOOK UNDER DEVELOPMENT IN THE VISUAL       │
│ PLAYBOOK EDITOR INTERFACE, WHEREIN THE ACTION BLOCK IDENTIFIES AN       │
│ ACTION TO BE PERFORMED BY THE SOAR SERVICE UPON ENCOUNTERING THE        │
│ ACTION BLOCK DURING EXECUTION OF THE PLAYBOOK, AND WHEREIN THE ACTION   │
│ IS IMPLEMENTED IN PART BY AN APP PROVIDING A CLIENT INTERFACE TO AN     │
│ APPLICATION PROGRAMMING INTERFACE (API) FOR A DEVICE OR SERVICE         │
│ RELATED TO THE SOAR SERVICE                                             │
│ 902                                                                     │
└─────────────────────────────────────────────────────────────────────────┘
                                    │
                                    ▼
┌─────────────────────────────────────────────────────────────────────────┐
│ IDENTIFYING, BASED ON DATA DESCRIBING ACTIONS PROVIDED BY THE APP, AN   │
│ INPUT PARAMETER ASSOCIATED WITH THE ACTION BLOCK, WHEREIN THE DATA      │
│ INDICATES THAT THE INPUT PARAMETER IS ONE OF: AN ARRAY REPRESENTING AN  │
│ ORDERED COLLECTION OF VALUES, OR AN OBJECT REPRESENTING AN UNORDERED    │
│ COLLECTION OF NAME-VALUE PAIRS                                          │
│ 904                                                                     │
└─────────────────────────────────────────────────────────────────────────┘
                                    │
                                    ▼
┌─────────────────────────────────────────────────────────────────────────┐
│ CAUSING DISPLAY, IN THE VISUAL PLAYBOOK EDITOR INTERFACE, OF ONE OR     │
│ MORE GRAPHICAL INTERFACE ELEMENTS CORRESPONDING TO THE INPUT PARAMETER  │
│ 906                                                                     │
└─────────────────────────────────────────────────────────────────────────┘
                                    │
                                    ▼
┌─────────────────────────────────────────────────────────────────────────┐
│ RECEIVING, VIA THE ONE OR MORE GRAPHICAL INTERFACE ELEMENTS, ONE OR     │
│ MORE INPUT VALUES FOR THE INPUT PARAMETER                               │
│ 908                                                                     │
└─────────────────────────────────────────────────────────────────────────┘
                                    │
                                    ▼
┌─────────────────────────────────────────────────────────────────────────┐
│ GENERATING A REPRESENTATION OF THE ONE OR MORE INPUT VALUES ACCORDING   │
│ TO A DATA INTERCHANGE FORMAT                                            │
│ 910                                                                     │
└─────────────────────────────────────────────────────────────────────────┘
                                    │
                                    ▼
┌─────────────────────────────────────────────────────────────────────────┐
│ PROVIDING, TO THE APP, THE REPRESENTATION OF THE ONE OR MORE INPUT      │
│ VALUES                                                                  │
│ 912                                                                     │
└─────────────────────────────────────────────────────────────────────────┘
```

FIG. 9

COMPLEX ACTION PARAMETER SUPPORT IN A VISUAL PLAYBOOK EDITOR

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Monitoring the operation and security of even a moderately complex computing environment typically involves a large number of tasks such as, for example, investigating alerts generated by various operational and security monitoring applications, performing tasks to detect, triage, and respond to identified threats, and the like. To aid administrators of such environments with these and other tasks, some data intake and query systems provide users with a range of information technology (IT) and security-related software-based applications and services (such as, e.g., integrated security operations services, Security Orchestration, Automation, and Response (SOAR) services, threat intelligence management services, etc.). These applications and services broadly enable users to monitor, detect, and investigate operational and security-related incidents, to automate repetitive tasks, and to strengthen defenses by connecting and coordinating complex workflows across security analyst teams and tools.

BRIEF DESCRIPTION OF THE DRAWINGS

Illustrative examples are described in detail below with reference to the following figures:

FIG. 7 is a flow diagram illustrating operations of a method in which a SOAR service automatically manages apps used to interface with one or more related devices or services according to some examples.

FIG. 9 is a flow diagram illustrating operations of a method in which a visual playbook editor interface of a SOAR service displays interface elements corresponding to complex parameters associated with an action to some examples.

DETAILED DESCRIPTION

Figure 1:
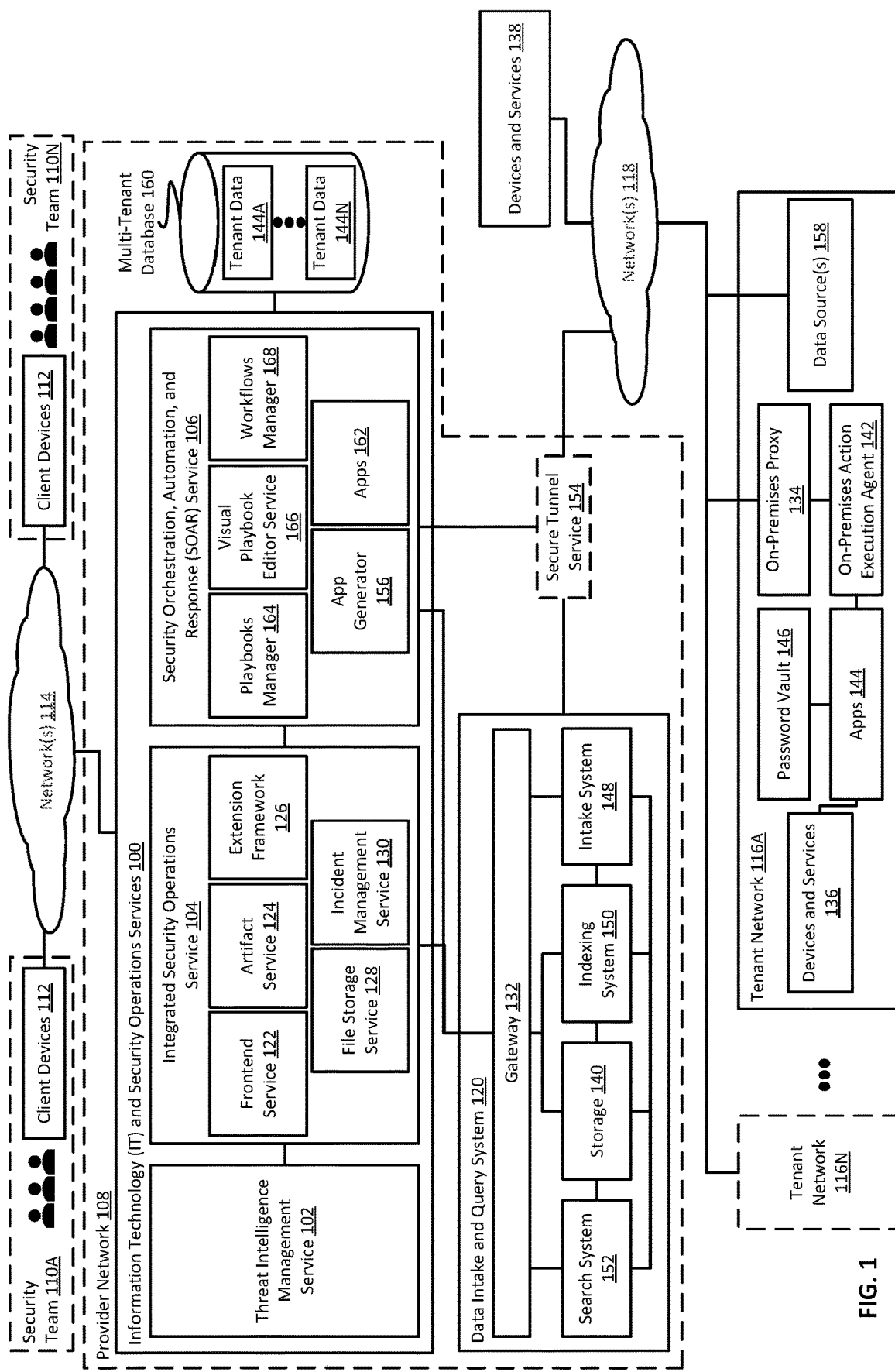
FIG. 1 is a diagram of an example computing environment in which a security orchestration, automation, and response (SOAR) service integrates with related devices and services to automate responses to security and operational threats impacting information technology (IT) environments according to some examples.

The present disclosure relates to methods, apparatus, systems, and non-transitory computer-readable storage media for improvements to a software-based security, orchestration, automation, and response (SOAR) service. According to examples described herein, techniques are provided for enabling a SOAR service to automatically manage apps (sometimes alternatively referred to as "connectors," "plug-ins," or "integrations") used to interface with an integrated security operations service and other related devices and services (e.g., threat intelligence services, firewalls, etc.). Further described herein is a SOAR app generator service or application used to automate the creation of apps for a SOAR service based on application programming interfaces (API) specifications for related devices or services, as well as visual playbook editor interfaces for a SOAR service that enable the configuration of complex action input parameters including arrays and objects.

Broadly, a SOAR service is a software-based application or service used to help security operations teams and other users coordinate, execute, and automate tasks related to maintaining the security and operation of information technology (IT) environments. Among other functionality, a SOAR service can ingest security and operational events from various data sources (e.g., a data intake and query system, firewalls, or other devices and services); triage, analyze, and track security and operational events in a unified interface; and automate responses to security events with automation playbooks and other features. In some examples, a SOAR service is provided as a software-as-a-service (SaaS) solution provisioned using computing resources provided by a cloud provider network. In other examples, a SOAR service can be provided as a standalone service or application hosted in users' on-premises IT environments, or as a hybrid system hosted on a combination of cloud-based and on-premises resources.

As indicated, SOAR services enable the automation of tasks related to maintaining the security and operation of information technology (IT) environments. To provide these automation capabilities, some SOAR services enable the configuration of "apps" (sometimes alternatively referred to as "connectors," "plug-ins," or "integrations") used to expand the capabilities of a SOAR services by enabling the service to interact with third party devices and services. These third-party devices and services (e.g., security information and event management systems (SIEM) systems, endpoint detection and response tools, firewalls, threat intelligence platforms, ticketing systems, etc.) can enable the SOAR service to execute actions implemented by the third-party devices and services via APIs or other type of interfaces. For example, an app associated with a firewall product might provide actions for blocking and unblocking access to IP addresses, applications, and URLs; an app associated with a URL reputation service might include an action for finding the reputation of URLS provided as input; and so forth.

A SOAR service can execute the actions provided by configured apps upon request from a user or as part of the execution of a playbook. Playbooks are a SOAR service feature used to define reusable series of automation tasks that act on data ingested by the SOAR service, where such tasks can include actions provided by any configured apps. Users can use pre-made playbooks or can create custom playbooks using a visual playbook editor or other interface, in many cases without writing any code. Playbooks can help automate a wide range of security and operational scenarios such as, for example, investigating and responding to phishing threats, instances of malware, command-and-control attacks, server outages, and the like.

In many environments, users of a SOAR service may often also use an integrated security operations service, as well as any number of other related devices and services, in conjunction with a SOAR service. An integrated security operations service, for example, can broadly provide interfaces and other features related to threat detection, investigation, and response that allow users to triage, investigate, and respond to security incidents (e.g., via a connected SOAR service) from a unified console interface. In this example, to enable a SOAR service to interface with an integrated security operations service, an app can be provided to enable the SOAR service to execute actions provided by the integrated security operations service. For example, the app for an integrated security operations service might enable a SOAR service to execute, via the integrated security operations service, actions such as creating or updating incidents, obtaining files related to incidents, obtaining or updating response plan tasks, and the like.

Typically, SOAR services, integrated security operations services, and other related devices and service are developed according to their own development and deployment schedules relative to other services and applications, even in scenarios where a same entity develops two or more of the services. Thus, for example, different versions of an integrated security operations service can exist, and different users of the service can use different versions of the service at any given time. Among other differences, each version of an integrated security operations service or other type of related device or service can be associated with a different set of supported actions executable by a SOAR service. Furthermore, once a SOAR service and an associated integrated security operations service have established communications with one another, the mechanisms by which the services communicate with one another can change over time. For example, in scenarios where a SOAR service uses an access token or other temporary credentials to authenticate itself with the integrated security operations service, the access token or other credentials can be rotated periodically to reduce the risk of unauthorized access if the credentials are compromised. These and other considerations introduce several challenges with respect to providing apps for the SOAR service to use for interacting with these related devices and services. For example, different versions of an app may be needed to communicate with different versions of a related device or service, the devices and services can be updated to newer versions out-of-band with respect to the apps used by users' SOAR service instances, and the apps may be required to manage access token rotations or other credentials management according to the processes provided for by the related devices and services.

To address these and other challenges, described herein are automated SOAR service app management techniques in which a SOAR service automatically obtains, configures, and manages apps used to integrate with related devices and services. The ability to dynamically obtain and configure such apps enables a SOAR service to maintain synchronous support for the actions and processes provided by related devices and services. Furthermore, the automated management of such apps enables the related devices and services to define, and to update over time, the functionality exposed to the SOAR service without necessitating changes to the SOAR service itself. The dynamic enhancement of SOAR service capabilities in this way enables a SOAR service to provide better security and operational performance in IT environments monitored by the SOAR platform, among other benefits.

The examples described herein further provide a service or application, referred to herein as a SOAR app generator, that can generate SOAR service apps for devices and services related to the SOAR service based on API specifications for the devices and service (such as, e.g., specifications conforming to the OpenAPI specification format). The SOAR app generator can receive requests to generate SOAR service apps for related devices or services, where the requests identify a relevant API specification. Based on a specification provided to the SOAR app generator, according to examples described herein, the SOAR app generator automatically generates source code implementing a client interface to the API provided by the relevant device or service, as well as other source code used to integrate the app with the SOAR service, metadata describing the app and functionality provided by the app, among other app artifacts. The automatic generation of SOAR service apps from API specifications in this manner enables users to readily integrate IT security and operations applications, devices, and services into the SOAR service, and to readily update apps to expose new functionality provided by related devices and services, thereby further improving the ability of the SOAR service to monitor the security and operation of IT environments.

The use of a SOAR service can include the use of a visual playbook editor interface to create playbooks, as described above. The creation of a playbook using a visual playbook editor typically includes configuring input and output parameters associated with actions in the playbook. In existing visual playbook editor interfaces, users are often limited in the types of input parameters that can be configured in a visual playbook editor interface. For example, existing playbook editor interfaces typically include input fields that enable users to specify values for fields expecting strings, numerical values, Boolean values, and the like. However, some types of actions supported by related devices and services involve complex input parameters such as, for example, arrays of values and objects representing unordered collections of name-value pairs. According to examples described herein, enhanced visual playbook editor functionality is described to enable support for configuring actions including complex input and output parameter types.

FIG. 1 is a diagram of an example computing environment in which a security, orchestration, automation and response (SOAR) service interfaces with related devices and services to automate responses to security and operational threats impacting information technology (IT) environments according to some examples. As shown in FIG. 1, IT and security operations services 100, including a threat intelligence management service 102, an integrated security operations service 104, and a SOAR service 106, each comprise software components executed by one or more electronic computing devices. In some examples, the computing devices are provided by a cloud provider network 108 (e.g., as part of a shared computing resource environment) while, in other examples, IT and security operations services 100 execute on computing devices managed within an on-premises datacenter or other computing environment, or on computing devices located within a combination of cloud-based and on-premises computing environments.

The IT and security operations services 100 broadly enable users to perform security orchestration, automation, and response operations involving components of an organization's computing infrastructure (or components of multiple organizations' computing infrastructures). Among other benefits, an IT and security operations services 100 enable security teams and other users to automate repetitive tasks, to efficiently respond to security incidents and other operational issues, and to coordinate complex workflows across security teams and diverse IT environments. For example, users associated with various IT operations or security teams (sometimes referred to as "analysts," where such analysts may be part of a security team 110A, . . . , security team 110N) can use client computing devices 112 to interact with the IT and security operations services 100 via one or more network(s) 114 to perform operations relative to IT environments for which they are responsible (such as, for example, one or more of tenant network 116A, . . . , tenant network 116N, which may be accessible over one or more intermediate network(s) 118, where network(s) 118 may be the same or different from network(s) 114 and can include, e.g., the public internet). Although only two security teams are depicted in the example of FIG. 1, in general, any number of separate security teams can concurrently use IT and security operations services 100 to manage any number of tenant networks, where each individual security team may be responsible for one or more tenant networks.

Users can interact with IT and security operations services 100 and a data intake and query system 120 using client devices 112. The client devices 112 can communicate with the IT and security operations services 100 and with data intake and query system 120 in a variety of ways such as, for example, over an internet protocol via a web browser or other application, via a command line interface, via a software developer kit (SDK), and the like. In some examples, the client devices 112 can use one or more executable applications or programs from an application environment to interface with the data intake and query system 120, such as the IT and security operations services 100. The application environment can include, for example, tools, software modules (e.g., computer executable instructions to perform a particular function), etc., that enable application developers to create computer executable applications to interface with IT and security operations services 100 and/or data intake and query system 120. The IT and security operations services 100, for example, can use aspects of the application environment to interface with the data intake and query system 120 to obtain relevant data, process the data, and display it in a manner relevant to the IT operations and security context. As shown, each of the IT and security operations services 100 can further include additional backend services, middleware logic, front-end user interfaces, data stores, and other computing resources, and can provide other facilities for ingesting use case specific data and interacting with that data, as described herein.

As an example of using the application environment, the IT and security operations services 100 can include custom web-based interfaces (e.g., provided by a frontend service 122 for the integrated security operations service 104) that optionally rely on one or more user interface components and frameworks provided by the application environment. For example, an integrated security operations service 104 can include a "mission control" type interface or set of interfaces. In this context, a mission control interface can refer to any type of interface that broadly enables users to obtain information about their IT environments, to configure automated actions, playbooks, etc., and to perform operations related to IT and security infrastructure management. The IT and security operations services 100 can further include middleware business logic (in the example of the integrated security operations service 104, for example, an artifact service 124, an extension framework 126, a file storage service 128, and an incident management service 130) implemented on a middleware platform of developers' choice. Furthermore, in some examples, some or all the IT and security operations services 100 can be instantiated and executed in a different isolated execution environment relative to the data intake and query system 120 and to other instances of the IT and security operations services 100. As a non-limiting example, in cases where a data intake and query system 120 is implemented at least in part in a Kubernetes cluster, one or more of the IT and security operations services 100 can execute in different Kubernetes clusters (or other isolated execution environment system) and interact with the data intake and query system 120 via the gateway 132.

In examples where any of the IT and security operations services 100 is deployed in a tenant network, the service can instead be deployed as a virtual appliance at one or more computing devices managed by an organization using the IT and security operations services. A virtual appliance, for example, can include a VM image file that is pre-configured to run on a hypervisor or directly on the hardware of a computing device and that includes a pre-configured operating system upon which the IT and security operations service executes. In other examples, an IT and security operations service 100 can be provided and installed using other types of standalone software installation packages or software package management systems. Depending on the implementation and user preference, an IT and security operations service 100 optionally can be configured on a standalone server or in a clustered configuration across multiple separate computing devices.

A user can initially configure an IT and security operations service 100 using a web-based console or other interface provided by the IT and security operations service 100 (for example, as provided by a frontend service 122 of the integrated security operations service 104). For example, users can use a web browser or other application to navigate to the IP address or hostname associated with an IT and security operations service 100 to access console interfaces, dashboards, and other interfaces used to interact with various aspects of the service. The initial configuration can include creating and configuring user accounts, configuring connection settings to one or more tenant networks (for example, including settings associated with one or more on-premises proxies 134 used to establish connections between on-premises networks and an IT and security operations service 100 running in a provider network 108 or elsewhere), and performing other optional configurations. In some examples, a same user account or set of user accounts can be used across multiple IT and security operations services 100 or, in other examples, one or more of the services can provide independent user accounts.

A user (also sometimes referred to herein as a "customer," "tenant," or "analyst") of an IT and security operations service 100 can create one or more user accounts to be used by a security team or other users associated with the user. A user of an IT and security operations service 100, for example, typically desires to use the application to manage one or more tenant networks for which the user is responsible (illustrated by example tenant network 116A, . . . , tenant network 116N in FIG. 1). A tenant network can include any number of devices and services 136 operating as part of a corporate network or other networked computing environment with which a user is associated. Although the tenant networks 116A, . . . , 116N are shown as separate from the provider network 108 in FIG. 1, more generally, a tenant network can include components hosted in an on-premises network, in a provider network 108, or combinations of both (for example, as a hybrid cloud network).

In general, any of the devices and services 136 in a tenant network can potentially serve as a source of incident data (illustrated by data source(s) 158) to an IT and security operations service 100, a device or service against which actions can be performed by an IT and security operations service 100, or both. The devices and services 136 and other data source(s) 158 can include various types of computing devices, software applications, and services including, but not limited to, a data intake and query system 120 (which itself can ingest and process machine data generated by other devices and services 136), a security information and event management (SIEM) system, a representational state transfer (REST) client that obtains or generates incident data based on the activity of other devices and services 136, software applications (including operating systems, databases, web servers, etc.), routers, intrusion detection systems and intrusion prevention systems (IDS/IDP), client devices (for example, servers, desktop computers, laptops, tablets, etc.), firewalls, and switches. The devices and services 136 and other data source(s) 158 can execute or be stored upon any number separate computing devices and systems within a tenant network. As described herein, a SOAR service 106 and other IT and security operations services 100 can further interface with external devices and services 138 such as third-party threat intelligence services, Uniform Resource Locator (URL) reputation services, and the like, across network(s) 118.

During operation, data intake and query systems, SIEM systems, REST clients, and other system components of a tenant network obtain operational, performance, and security data from devices and services 136 and other data source(s) 158 in the network, analyze the data, and may identify potential IT and security-related incidents from time to time. A data intake and query system in a tenant network, for example, might identify potential IT-related incidents based on the execution of correlation searches against data ingested and indexed by the system, as described elsewhere herein. Other data sources 158 can obtain incident and security-related data using other processes. Once obtained, data indicating such incidents can be sent to the data intake and query system 120 or an IT and security operations service 100 via an on-premises proxy 134. For example, once a data intake and query system identifies a possible security threat or other IT-related incident based on data ingested by the data intake and query system, data representing the incident can be sent to the data intake and query system 120 via a REST application programming interface (API) endpoint implemented by a gateway 132 or a similar gateway of an IT and security operations service 100. As mentioned elsewhere herein, a data intake and query system 120 or IT and security operations service 100 can ingest, index, and store data received from each tenant network in association with a corresponding tenant identifier such that each tenant's data is segregated from other tenant data (for example, when stored in common storage 140 of the data intake and query system 120 or in a multi-tenant database 160 used by one or more IT and security operations services 100, including separate tenant data 144A, . . . , tenant data 144N).

As mentioned, in some examples, some or all the data ingested and created by IT and security operations services 100 in association with a particular tenant is generally maintained separately from other tenants (for example, as illustrated by tenant data 144A, . . . , tenant data 144N in the multi-tenant database 160). A tenant may further desire to keep data associated with two or more separate tenant networks segregated from one another. For example, a security team associated with a managed security service provider (MSSP) can be responsible for managing any number of separate tenant networks for various customers of the MSSP. As another example, a tenant corresponding to a business organization having large, separate departments or divisions might desire to logically isolate the data associated with each division. In such instances, a tenant can configure separate "departments" in an IT and security operations service 100, where each department is associated with a respective tenant network or other defined collection of data sources, computing resources, and so forth. Users and user teams can thus use this feature to manage multiple third-party entities or organizations using only a single login and permissions configuration for an IT and security operations service s100.

Once an IT and security operations service 100 (e.g., an integrated security operations service 104) obtains incident data, either directly from a tenant network or indirectly via a data intake and query system 120, the IT and security operations service 100 analyzes the incident data and enables users to investigate, determine possible remediation actions, and perform other operations. These actions can include default actions initiated and performed within a tenant network without direct interaction from user and can further include suggested actions provided to users associated with the relevant tenant networks. An integrated security operations service 104, for example, can recommend actions or playbooks of actions. Once the suggested actions are determined, these actions can be presented in a "mission control" dashboard or other interface accessible to users of the IT and security operations service 100. Based on the suggested actions, a user can select one or more particular actions to be performed and an IT and security operations service 100 (e.g., a SOAR service 106) can carry out the selected actions within the corresponding tenant network.

To enable users to orchestrate security workflows recommended by an integrated security operations service 104 or based on other input, a SOAR service 106 combines security and operational infrastructure orchestration, playbook automation, case management capabilities, among other features. In the example of FIG. 1, a SOAR service 106 can cause actions to be performed in tenant networks by sending action requests to an on-premises proxy 134, which further interfaces with an on-premises action execution agent (for example, on-premises action execution agent 142 in tenant network 116A). In this example, the on-premises action execution agent 142 receives action requests from the SOAR service 106 and carries out requested actions against devices and services 136 using apps 144 and optionally a password vault 146 (e.g., to authenticate an app to one or more devices and services 136). A SOAR service 106 can also include apps 162 used to interface with external device and services 138, devices and services located in tenant networks (e.g., devices and services 136), other services such as an integrated security operations service 104, threat intelligence management service 102, data intake and query system 120, and the like.

To execute actions against computing resources in tenant networks and elsewhere, in some examples, a SOAR service 106 uses a unified security language that includes commands usable across a variety of hardware and software products, applications, and services. To execute a command specified using the unified security language, in some examples, a SOAR service 106 (possibly via an on-premises action execution agent 142) uses one or more apps 162 or apps 144 to translate the commands into the one or more processes, languages, scripts, etc., necessary to implement the action at one or more devices and services 136, devices or services 138, integrated security operations service 104, etc. For example, a user might provide input requesting the SOAR service 106 to remove an identified malicious process from multiple computing systems in the tenant network 116A, where two or more of the computing systems are associated with different software configurations (for example, different operating systems or operating system versions). Accordingly, in some examples, the SOAR service 106 can send an action request to an on-premises action execution agent 142, which then uses one or more apps 144 to translate the command into the necessary processes to remove each instance of the malicious process on the varying computing systems within the tenant network.

In some examples, a SOAR service 106 includes a playbooks manager 164 that enables users to automate actions or series of actions by creating digital "playbooks" that can be executed by the SOAR service 106. At a high level, a playbook represents a customizable computer program that can be executed by a SOAR service 106 to automate a wide variety of possible operations related to an IT environment. These operations—such as quarantining devices, modifying firewall settings, restarting servers, and so forth—are typically performed by various security products by abstracting product capabilities using an integrated "app model." Additional details related to operation of the SOAR service 106 and use of digital playbooks are provided elsewhere herein.

In some examples, SOAR service 106 can support both automation playbooks and input playbooks. An automation playbook can be used to run automatically based on triggers. In some examples, an input playbook accepts configured inputs to run, provides configured outputs, and can be used as a sub-playbook of another automation or input playbook. In other examples, any type of playbook can be used as an automation playbook or input playbook (e.g., a SOAR service 106 need not make a distinction between the two).

As mentioned, the IT and security operations services 100 can be implemented as a collection of interconnected services that each carry out various functionality as described herein. In the example shown in FIG. 1, the integrated security operations service 104, for example, includes a frontend service 122, an artifact service 124, an extension framework 126, a file storage service 128, and an incident management service 130. The example IT and security operations services 100, and the set of services comprising each of IT and security operations service 100 in FIG. 1, are provided for illustrative purposes only; in other examples, an IT and security operations services 100 can be comprised of more or fewer services and each service may implement the functionality of one or more of the services shown.

In some examples, an incident management service 130 of an integrated security operations service 104 is responsible for obtaining incidents or events (sometimes also referred to as "notables"), either directly from various devices and services 136 or other data sources 158 in tenant networks or directly based on data ingested by the data intake and query system 120 via the gateway 132. The frontend service 122 provides user interfaces to users of the application, among other processes described herein. Using these user interfaces, users of the integrated security operations service 104 can perform various application-related operations, view displays of incident-related information, and can configure administrative settings, license management, content management settings, and so forth. In some examples, an artifact service 124 manages artifacts associated with incidents received by the application, where incident artifacts can include information such as IP addresses, usernames, file hashes, and so forth. In some examples, a threat intelligence management service 102 obtains data from external or internal sources to enable other services to perform various incident data enrichment operations. As one non-limiting example, if an incident is associated with a file hash, a threat intelligence management service 102 can be used to correlate the file hash with external threat feeds to determine whether the file hash has been previously identified as malicious. In some examples, file storage service 128 enables other services to store incident-related files, such as email attachments, files, and so forth.

In some examples, a SOAR service 106 performs a wide range of SOAR capabilities such as action execution, playbook execution (via a playbooks manager 164), playbook creation (via a visual playbook editor service 166), scheduling work to be performed, user approvals and so forth as workflows (via a workflows manager 168), among other functionality described herein. In some examples, a SOAR service 106 includes an app editor that enables users to create, modify, and test apps (e.g., including apps 162 or apps 144) using a built-in app editor. According to examples described herein, a SOAR service 106 further includes an app generator 156 used to automatically generate apps based on API specifications for related devices and the services.

The operation of an IT and security operations service 100 generally begins with the ingestion of data related to various types of incidents involving computing resources of various tenant networks (for example, devices and services 136 or other data sources 158 of a tenant network 116A). In some examples, users configure an IT and security operations service 100 to obtain, or "ingest," data from one or more defined data sources 158, where such data sources can be any type of computing device, application, or service that supplies information that users may want to store or act upon, and where such data sources may include one or more of the devices or services 136 or any other data sources which generate data based on the activity of one or more devices or services. As mentioned, examples of data sources include, but are not limited to, a data intake and query system such as the SPLUNK® ENTERPRISE system, a SIEM system, a REST client, applications, routers, intrusion detection systems (IDS)/intrusion prevention systems (IDP) systems, client devices, firewalls, switches, or any other source of data identifying potential incidents in tenants' IT environments. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In some examples, data can be sent from tenant networks to an IT and security operations service 100 using any of several different mechanisms. As one example, data can be sent to data intake and query system 120, processed by an intake system 148 (e.g., including indexing of resulting event data by an indexing system 150, thereby further causing the event data to be accessible to a search system 152), and obtained by an incident management service 130 of an IT and security operations service 100 via a gateway 132. As another example, components can send data from a tenant network directly to an incident management service 130 or other endpoint, for example, via a REST endpoint.

In some examples, data ingested by an IT and security operations service 100 from tenant networks or other sources can be represented in an IT and security operations service 100 by data structures referred to as "incidents, "events," "notables," or "containers". Here, an incident or event is a structured data representation of data ingested from a data source and that can be used throughout IT and security operations services 100. In some examples, an IT and security operations service 100 can be configured to create and recognize different types of incidents depending on the corresponding type of data ingested, such as "IT incidents" for IT operations-related incidents, "security incidents" for security-related incidents, and so forth. An incident can further include any number of associated events and "artifacts," where each event or artifact represents an item of data associated with the incident. As a non-limiting example, an incident used to represent data ingested from an anti-virus service and representing a security-related incident might include an event indicating the occurrence of the incident and associated artifacts indicating a name of the virus, a hash value of a file associated with the virus, a file path on the infected endpoint, and so forth.

An incident of an IT and security operations service 100 can be associated with a status or state that may change over time. Analysts and other users can use this status information, for example, to indicate to other analysts which incidents an analyst is actively investigating, which incidents have been closed or resolved, which incidents are awaiting input or action, and the like. Furthermore, an IT and security operations service 100 can use the transitions of incidents from one status to another to generate various metrics related to analyst efficiency and other measurements of analyst teams. For example, an IT and security operations service 100 can be configured with a number of default statuses, such as "new" or "unknown" to indicate incidents that have not yet been analyzed, "in progress" for incidents that have been assigned to an analyst and are under investigation, "pending" for incidents that are waiting input or action from an analyst, and "resolved" for incidents that have been addressed by an assigned analyst. An amount of time that elapses between these statuses for a given incident can be used to calculate various measures of analyst and analyst team efficiency, such as measurements of a mean time to resolve incidents, a mean time to respond to incidents, a mean time to detect an incident that is a "true positive," a mean dwell time reflecting an amount of time taken to identify and remove threats from an IT environment, among other possible measures. Analyst teams can also create custom statuses to indicate incident states that may be more specific to the way that analyst team operates, and can further create custom efficiency measurements based on such custom statuses.

In some examples, an IT and security operations service 100 also generates and stores data related to its operation and activity conducted by tenant users including, for example, playbook data, workbook data, user account settings, configuration data, and historical data (such as, for example, data indicating actions taken by users relative to particular incidents or artifacts, data indicating responses from computing resources based on action executions, and so forth), in one or more multi-tenant databases 160. In other examples, some or all the data above is stored in storage managed by the data intake and query system 120 and accessed via the gateway 132. These multi-tenant database(s) 160 can operate on a same computer system as the IT and security operations services 100 or at one or more separate database instances. As mentioned, in some examples, the storage of such data by the data intake and query system 120 and IT and security operations services 100 for each tenant is generally segregated from data associated with other tenants based on tenant identifiers stored with the data or other access control mechanisms.

An IT and security operations service 100 can define and implement many different types of "actions," which represent high-level, vendor- and product-agnostic primitives that can be used throughout the IT and security operations services 100. Actions generally represent simple and user-friendly verbs that are used, e.g., by a SOAR service 106 to execute actions in playbooks or manually through other user interfaces of the IT and security operations services 100, where such actions can be performed against one or more computing resources in an IT environment. In many cases, a same action defined by the IT and security operations service 100 can be carried out on computing resources associated with different vendors or configurations via action translation processes performed by apps of the platform, as described in more detail elsewhere herein. Examples of actions that can be defined by an IT and security operations services 100 include a "get process dump" action, a "block IP address" action, a "suspend VM" action, a "terminate process" action, and so forth.

As indicated, a SOAR service 106 enables connectivity with various IT computing resources in a provider network 108, with devices and services 136 in tenant networks 116A, . . . , 116N, with external devices and services 138, including IT computing resources from a wide variety of third-party IT and security technologies, and further enables the ability to execute actions against those computing resources via apps (e.g., via apps 162 or apps 144). An app broadly represents program code or other executable logic that provides an abstraction layer via one or more libraries, APIs, or other interfaces to one or more of hundreds of possible IT and security-related products and services. The abstraction layer of an app exposes a collection of actions supported by those products and services.

As indicated, the operation of a SOAR service 106 can include the ability to create and execute customizable playbooks. At a high level, a playbook comprises computer program code and possibly other data that can be executed by a SOAR service 106 to carry out an automated set of actions (for example, as managed by a playbooks manager 164). In some examples, a playbook is comprised of one or more actions where each action is associated with program code that performs defined functionality when the action is encountered during execution of the playbook of which it is a part. As an example, a first action block of a playbook might implement functionality involving one or more devices or services 136 (e.g., involving configuration of a network setting, restarting a server, etc.); another action block might filter data generated by the first function block in some manner; yet another action block might obtain information from an external device or service 138, and so forth. A playbook is further associated with a control flow that defines an order in which the SOAR service 106 executes the action blocks of the playbook, where a control flow can potentially vary at each execution of a playbook depending on particular input conditions (e.g., where the input conditions can derive from attributes associated with an incident triggering execution of the playbook or based on other input).

In some examples, the SOAR service 106 provides a visual playbook editor service 166 enabling users to create and modify playbooks using a graphical user interface (GUI). Using a visual playbook editor GUI, for example, users can codify a playbook by creating and manipulating a displayed graph including nodes and edges, where each of the nodes in the graph represents one or more action blocks that each perform one or more defined operations during execution of the playbook, and where the edges represent a control flow among the playbook's function blocks. In this manner, users can create playbooks that perform complex sequences of operations without having to write any source code, unless desired. For example, the visual playbook editor service 166 further enable users to supplement or modify the automatically generated code by editing the code associated with a visually designed playbook, as desired.

In some examples, a SOAR service 106 provides playbook management interfaces that enable users to locate and organize playbooks associated with a user's or tenant's account. A playbook management interface, for example, can display a list of playbooks that are associated with a user's or tenant's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is stored, a status of the playbook, and the like.

Users can create a new digital playbook starting from a playbook management interface or using another interface provided by the SOAR service 106. Using a playbook management interface, for example, a user can select a "create new playbook" interface element and the SOAR service 106 causes display of a visual playbook editor interface including a graphical canvas on which users can add nodes representing actions to be performed during execution of the playbook, where the actions are implemented by associated source code that can be automatically generated by the visual playbook editor, and further add connections or edges among the nodes defining an order in which the represented operations are to be performed upon execution.

Once a user has codified a playbook using a visual playbook editor or other interface, the playbook can be saved (for example, in a multi-tenant database 160 and in association with one or more user accounts) and run by the SOAR service 106 on-demand. A playbook typically includes a "start" block that is associated with source code that begins execution of the playbook. More particularly, the SOAR service 106 executes the function represented by the start block for a playbook with "container context" comprising data about an incident against which the playbook is executed, where the container context can be derived from input data from one or more configured data sources. A playbook can be executed manually in response to a user providing input requesting execution of the playbook, or playbooks can be executed automatically in response to an IT and security operations service 100 identifying one or more events matching certain criteria. In examples where the source code associated with a playbook is based on an interpreted programming language (for example, based on the Python programming language), the SOAR service 106 can execute the source code represented by the playbook using an interpreter and without compiling the source code into compiled code. In other examples, the source code associated with a playbook can first be compiled into byte code or machine code the execution of which can be invoked by the SOAR service 106.

Referring again to the integrated security operations service 104, in some examples, an optional IT and security operations service extension framework 126 allows users to extend the user interfaces, data content, and functionality of an IT and security operations service 100 in various ways to enhance and enrich users' workflow and investigative experiences. Example types of extensions enabled by the extension framework 126 include modifying or supplementing GUI elements (including, e.g., tabs, menu items, tables, dashboards, visualizations, etc.) and other components (including, e.g., response templates, connectors, playbooks, etc.), where users can implement these extensions at predefined extension points of the IT and security operations service 100. In some examples, an extension framework 126 further includes a data integration system that provides users with mechanisms to integrate data from external applications, services, or other data sources into their extensions (e.g., to visualize data from any external data source in the IT and security operations service 100 or to otherwise enhance users' investigative experience with data originating outside of the IT and security operations services 100 or data intake and query system 120).

The types of users that might be interested in creating extensions using an extension framework 126 include, for example, development teams associated with a data intake and query system 120, developers of third-party applications or services relevant to an IT and security operations service 100 (e.g., developers of VM management software, cloud computing resource management software, etc.), or any other users of an IT and security operations service 100. Users of an IT and security operations service 100 might, for example, desire to enhance their own workflows and other processes by enabling internal user information lookups, creating internal ticketing system postings, or enabling any other desired visualizations or actions at various points in an IT and security operations service. In some examples, the extension framework 126 enables users to create extensions using "No-Code" development tools, e.g., where users can define the specifications for custom visualizations, data integrations, and other plugin components without direct user coding (e.g., without the direct creation of JavaScript code, JSON specifications, or other data comprising a plugin), although users can also modify the underlying extension components as desired.

As one example use case for an extension, consider a cybersecurity company that provides security software that is known to be used by users of an IT and security operations service 100. In this example, developers of the security software might desire for certain information collected or generated by the security software to be visible at various points within the integrated security operations service 104, e.g., to create a tighter integration of the two software applications. The developers, for example, might desire for users of the integrated security operations service 104 to be able to view endpoint information, malware information, etc., collected by the security application when users view various visualizations or other incident information in the integrated security operations service 104 that is associated with the data collected by the security software.

In the example above, developers associated with the cybersecurity company can use the extension framework 126 to create an extension that integrates the data collected by the security application with the integrated security operations service 104. Users who subscribe to the extension can then view relevant data or perform other actions when the users navigate to defined extension points of the integrated security operations service 104. Numerous other such use cases exist for a wide variety of applications, data sources, and desired functionality related to IT and security operations services 100.

In some examples, components external to the IT and security operations services 100 interface with an intermediary secure tunnel service 154 to send communications to, and to receive communications from, an IT and security operations service 100 running in a provider network 108. In some examples, the secure tunnel service 154 operates as a service that establishes WebSocket or other types of secure connections to endpoint devices or services. As one example, the secure tunnel service 154 can establish a first secure connection to a IT and security operations service 100 and a second secure connection to an on-premises proxy 134 and an on-premises action execution agent 142 executing in a tenant network 116A, where each connection is established using a handshake technique with the respective endpoints. Once established, the connection enables two-way communications between the IT and security operations service 100 (e.g., via a separate proxy implemented by the IT and security operations services 100) and the on-premises action execution agent 142 without the need to open a port in a firewall or perform other configurations to a network associated with the tenant network 116A. In some examples, the secure tunnel service 154 is a cloud-based service (e.g., executing using computing resources provided by a provider network 108) configured to transfer data between an IT and security operations service 100 and computing devices located on networks external to the provider network 108, including on-premises action execution agents, mobile devices, and the like. In other examples, the secure tunnel service 154 executes using computing resources located outside of a cloud-based environment.

In some examples, the secure tunnel service 154 performs authentication operations with other components (e.g., the IT and security operations services 100 and an on-premises proxy or on-premises action execution agent) to establish trust and then establishes secure communications channels with those components, where the secure tunnel service 154 and other components transmit secure communications using the secure communications channels. In some examples, the secure tunnel service 154 provides end-to-end encryption (E2EE) of communications between the IT and security operations services 100 and on-premises action execution agents via on-premises proxies by transmitting one or more encrypted data packets between the IT and security operations services 100 and the on-premises proxies. In some examples, communications sent through the secure tunnel service 154 are in the form of data packets, where each data packet includes, for example, a payload and a device identifier for a destination device that is to receive the data packet. In other examples, the data packet can also include a device identifier for the source device or an instance identifier that indicates an IT and security operations service instance associated with the data packet. In some examples, the data packet is encrypted prior to being transmitted to the secure tunnel service 154, e.g., using a public key of an asymmetric key pair generated by a receiving device. While in some examples, the secure tunnel service 154 decrypts the data packet before sending the data packet to its intended destination, in other examples, the secure tunnel service 154 forwards the encrypted data packet to its intended destination without performing a decryption process.

The IT and security operations services 100 and on-premises proxies can communicate with the secure tunnel service 154 across network(s) 118. As indicated herein, the networks 118 can be communications networks, such as a local area network (LAN), wide area network (WAN), cellular network (e.g., LTE, HSPA, 3G, 4G, and/or any other network based on cellular technologies), and/or networks using any of wired, wireless, terrestrial microwave, or satellite links. In some examples, after an on-premises action execution agent is installed and executed within a tenant network, the on-premises action execution agent uses an on-premises proxy to initiate a process to establish a secure connection (e.g., a gRPC Remote Procedure Calls (gRPC) over HTTP/2 connection) with a secure tunnel service 154. For example, the secure tunnel service 154 may establish the secure connection and associate the secure connection with a device identifier for the on-premises proxy.

In some examples, the secure tunnel service 154 maintains a database that stores document data structures and optionally stores keys. This database, for example, can be a structure query language (SQL) database, or a NoSQL database, such as an AMAZON® DynamoDB. In some examples, the database includes a key store that stores encryption keys, including single-use session keys and long-term keys associated with devices that send E2EE communications. In other examples, the secure tunnel service 154 does not store encryption keys and routes messages without the use of a key store. In some examples, the database also includes a routing table that includes address information associated with devices registered with the secure tunnel service 154 with which the service has established secure communications. The secure tunnel service 154, for example, can send queries to the database to determine, based on a device identifier in a particular data packet, the address of the intended recipient of the particular data packet.

As illustrated in FIG. 1, the secure tunnel service 154 may not directly communicate with an on-premises action execution agent but communicate instead through an on-premises proxy. As indicated herein, the on-premises proxy is a process executing in a tenant network and that operates as a gateway between the secure tunnel service 154 and the IT and security operations services 100. An on-premises proxy is configured to receive messages from the secure tunnel service 154 and forward the messages to an on-premises action execution agent for processing. The on-premises proxy can also be configured to generate and send messages (e.g., notifications, alerts, etc.) to IT and security operations services 100 via the secure tunnel service 154. In some examples, an on-premises proxy can also send messages to configured mobile devices in accordance with a push notification service, such as the APPLE® Push Notification service (APN), or GOOGLE® Cloud Messaging (GCM). In some examples, an on-premises proxy is configured to perform the management, generation, and registration of encryption keys used to communicate with the secure tunnel service 154.

Automated SOAR Service App Management

As indicated, several challenges exist with the manual configuration and use of apps used extend the capabilities of a SOAR service 106 to related devices and services, such as devices and services 136, device and services 138, an integrated security operations service 104, a threat intelligence management services 102, and the like. The examples described herein provide techniques and functionality that enable a SOAR service 106 to automatically manage such apps, thereby improving the SOAR service's ability to integrate with other devices and services and to automate responses to security and operational threats affecting users' IT environments.

Figure 2:
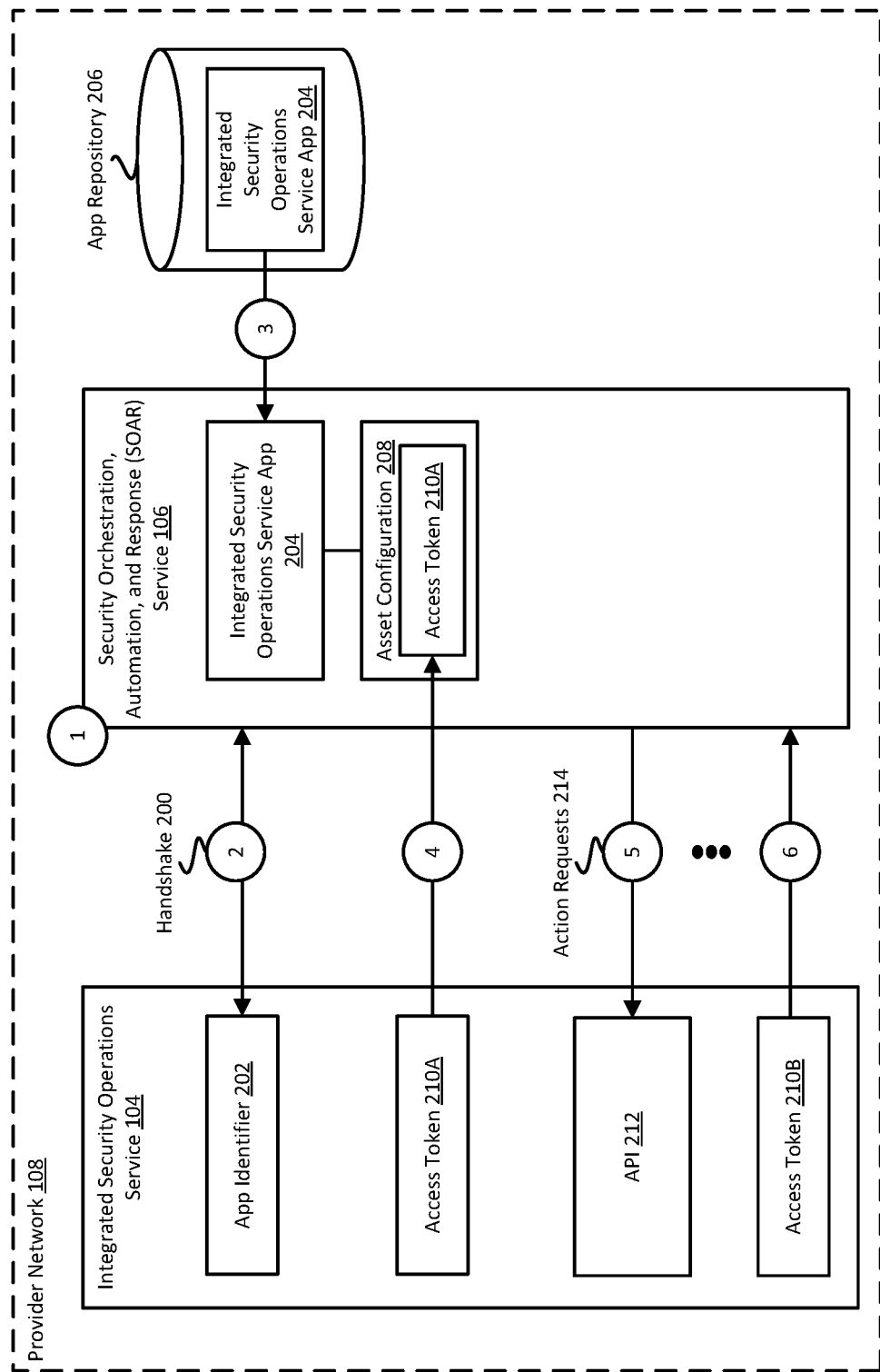
FIG. 2 is a diagram illustrating an example process by which a SOAR service instance automatically manages an app implementing a client interface to an integrated security operations service according to some examples.

FIG. 2 is a diagram illustrating an example process by which a SOAR service automatically manages an app implementing a client interface to an integrated security operations service instance according to some examples. As indicated, the SOAR service 106 broadly includes functionality that enables the execution of automated responses to security and operational incidents occurring in IT environments. The related devices and services (such as, e.g., an integrated security operations service 104 in the example of FIG. 2) with which a SOAR service 106 interfaces can broadly include any device or service providing an API defining one or more operations implemented by the device or service (e.g., a HTTP API enabling the SOAR service 106 to send HTTP requests to execute the actions). In this context, the apps managed by the SOAR service 106 broadly implement client interfaces to APIs provided by such related devices and services.

The numbered circles labeled "1"–"6" in FIG. 2 broadly describe a process in which an instance of the SOAR service 106 is launched, the SOAR service 106 performs a handshake with a related device or service; as part of the handshake, the related device or service sends a response to the SOAR service 106 instance including an identifier of an app associated with the device or service; the SOAR service 106 instance determines that it does not have the app installed; and the SOAR service 106 installs the app, at which point the SOAR service 106 instance can use the app to execute actions supported by the app. The numbered circles further describe techniques by which the SOAR service 106 instance can ensure that a current version of the app is in use over time, among other details described in more detail hereinafter.

In FIG. 2, at circle "1", an instance of the SOAR service 106 is launched. Here, launching an instance of the SOAR service 106 can refer to launching, in a provider network 108 or other computing environment, a copy of the computing resources and software stack used to implement the SOAR service 106 for a particular user or tenant. In other examples, a same instance of the SOAR service 106 can be used by multiple users and tenants and each user or tenant can be associated with respective configuration information and other data to distinguish one instance of the service from another.

In some examples, to launch an instance of the SOAR service 106, a user can create a user account (e.g., where the user account can optionally be used across the SOAR service 106, integrated security operations service 104, and possibly other services) and use the user account to request use of a SOAR service 106 instance for the user account (or for a tenant including the user account). In some examples, the request can be directed to the integrated security operations service 104, data intake and query system 120, or any other component which authenticates and authorizes the request, provisions any computing resources to be used to host the SOAR service 106 instance, and launches the SOAR service 106 instance using the provisioned resources. In some examples, the launching of the SOAR service 106 instance includes generating and storing configuration data to be used by the SOAR service 106 instance to communicate with a corresponding integrated security operations service 104, and possibly other related devices and services, over one or more networks. For example, a provisioning service can provide the SOAR service 106 instance with a URL or other endpoint identifier that can be used by the SOAR service 106 instance to send requests to the integrated security operations service 104. In some examples, a user provides input identifying one or more devices or services the user desires to use the SOAR service 106 in connection with and, based on the input, the provisioning service can provide identifying information for the identified devices or services as part of launching the SOAR service 106.

At circle "2," the instance of the SOAR service 106 performs a handshake 200 with the integrated security operations service 104 to establish a pairing between the SOAR service 106 instance and the integrated security operations service 104. As indicated, the SOAR service 106 instance can be provided with a URL or other identifier of an associated integrated security operations service 104 by a service responsible for provisioning the SOAR service 106 instance in the provider network 108 or other type of computing environment. The initial handshake 200 can be used to identify the SOAR service 106 instance to the integrated security operations service 104 so that, for example, the integrated security operations service 104 can send requests to perform SOAR operations to the corresponding SOAR service 106 (e.g., a SOAR service 106 instance associated with a same user account or tenant), and vice versa.

As part of the handshake 200 between the SOAR service 106 instance and the integrated security operations service 104, in some examples, the integrated security operations service 104 sends a message including an app identifier 202 of an integrated security operations service app 204 associated with the integrated security operations service 104. For example, the message can include a hash value derived from the app 204, an identifier of a version of the app, a storage location for the app, or any other identifying app information. The SOAR service 106 instance receives the message and determines whether the SOAR service 106 instance has the identified version of the app 204 installed. In the example of FIG. 2, the SOAR service 106 instance determines that the identified version of the app 204 is not yet installed (e.g., because this is the first time that the SOAR service 106 instance has communicated with the integrated security operations service 104). In some examples, the SOAR service 106 instance further obtains information about users and roles defined within the integrated security operations service 104 instance (e.g., in association with a tenant corresponding to the integrated security operations service 104 instance) as part of the handshake 200.

At circle "3," the SOAR service 106 instance obtains the app 204 from a storage location and installs the app. The storage location, for example, can be any network-accessible storage location provided by the integrated security operations services 104 or other system component for providing access to apps including the integrated security operations service app 204. For example, the storage location can be a centralized app repository 206, a download location identified by the related device or service, etc. In other examples, the integrated security operations service 104 can send the app 204 directly to the SOAR service 106 or store the app 204 in a storage location accessible to the SOAR service 106.

In some examples, installing the app 204 includes storing source code files and asset configuration data 208 in a defined location associated with the SOAR service 106 instance. The source code files, for example, can include code implementing a client API interface to an API 212 provided by the integrated security operations service 104, source code for integrating the app 204 into the SOAR service 106, configuration data describing the app and functionality provided by the app 204 (e.g., for use in displaying app actions and other information in visual playbook editor interfaces and other parts of the SOAR service 106).

In some examples, the asset configuration data 208 is used by the app 204 to communicate with the appropriate instance of the integrated security operations service 104. The asset configuration can include an access token 210A provided, at circle "4," by the integrated security operations service 104 to the SOAR service 106 as part of the handshake 200 or at a later time. Among other uses, the access token 210A enables the integrated security operations service 104 to authenticate requests sent by the SOAR service 106 to the integrated security operations service 104 and can further optionally enable a single sign-on across both the integrated security operations service 104 and the SOAR service 106.

Once the SOAR service 106 installs the app 204, at circle "5," the app 204 can be used by the SOAR service 106 instance to execute actions supported by the integrated security operations service 104. For example, the SOAR service 106 can execute the actions as part of the execution of playbooks, upon user request, or responsive to other types of input. As indicated, the action requests 214 generated by the app 204 to execute particular actions supported by the integrated security operations service app 204 can include the access token 210A to enable the integrated security operations service 104 to authenticate and authorize the action requests 214.

At circle "6," at some point in time, the integrated security operations service 104 sends new credentials (e.g., an access token 210B) to the SOAR service 106 instance. For example, an integrated security operations service 104 can periodically update, or rotate, access tokens used by client applications and services to reduce the risk of unauthorized access due to leaked access tokens or other issues. Using the new credentials, the SOAR service 106 instance updates its asset configuration data 208 for the integrated security operations service app 204 based on the updated access token obtained from the integrated security operations service.

In some examples, the integrated security operations service 104 can send, along with new access tokens or other periodic communications with the SOAR service 106 instance, an identifier of a current version of the app 204. Upon receiving an identifier of a current version of an app, the SOAR service 106 can compare the identifier of the current version to the version of the app installed by the SOAR service 106. If the SOAR service 106 instance determines that an updated version of an installed app exists, the SOAR service 106 instance can obtain the updated version of the app, similar to the process described in circle "3." In some examples, the SOAR service 106 can automatically install the updated version or the app or can generate an alert indicating that a new version of the app is available and request user permission to install the app.

In some examples, an updated version of an app can include a different set of actions compared to a previous version of the app. For example, an integrated security operations service 104 might add API support for one or more additional actions and update the corresponding app to enable the app to call the new actions. By installing the updated version of the app, the SOAR service 106 instance can automatically cause the new actions to be displayed in visual playbook editor interfaces and other components of the SOAR service 106 without changes to the implementation of the SOAR service 106 itself. For example, a visual playbook editor interface can be implemented such that it determines a collection of available actions based on information provided by any installed apps, thereby enabling the apps to determine what actions are exposed in the SOAR service's visual playbook editor interfaces and elsewhere.

In some examples, the apps that can be installed in association with a SOAR service 106 instance include an app for the SOAR service itself. For example, a SOAR service 106 app can expose a set of actions provided by an actions service of the SOAR service 106 for use in playbooks and elsewhere. Thus, upon launch of a SOAR service 106 instance, the SOAR service can send a request for a current version of an app for the SOAR service actions service and obtain the app (e.g., from an app repository 206 or elsewhere). Developers of the SOAR service 106 can then update the app as desired to expose new actions in a visual playbook editor interface and elsewhere without the need to modify or redeploy the functionality of the SOAR service 106 as a whole.

Automated Security, Orchestration, Automated, and Response (SOAR) App Generation Based on Application Programming Interface (API) Specification Data As indicated, a SOAR service 106 can use apps to interface with related devices and services via APIs or other type of interfaces to enable the SOAR service 106 to request the related devices and services to execute actions on its behalf. The types of APIs provided by such related devices and services can be specified using a specification document that defines the structure, parameters, responses, and security features of an API. As one example, the OpenAPI specification format provides one such specification format, although other formats can be used. Developers broadly use API specifications, for example, as a way to provide a consistent way to describe the structure of API endpoints, requests and response payloads, and other relevant information associated with an API. An API specification can then be used as a blueprint for other developers or software that plan to use an API described by such a specification. According to examples described herein, a SOAR app generator service or application is described that enables the creation of apps, including the client API interfaces and the supporting source code and metadata used to integrate the app into a SOAR service 106, based on these API specification documents.

Figure 3:
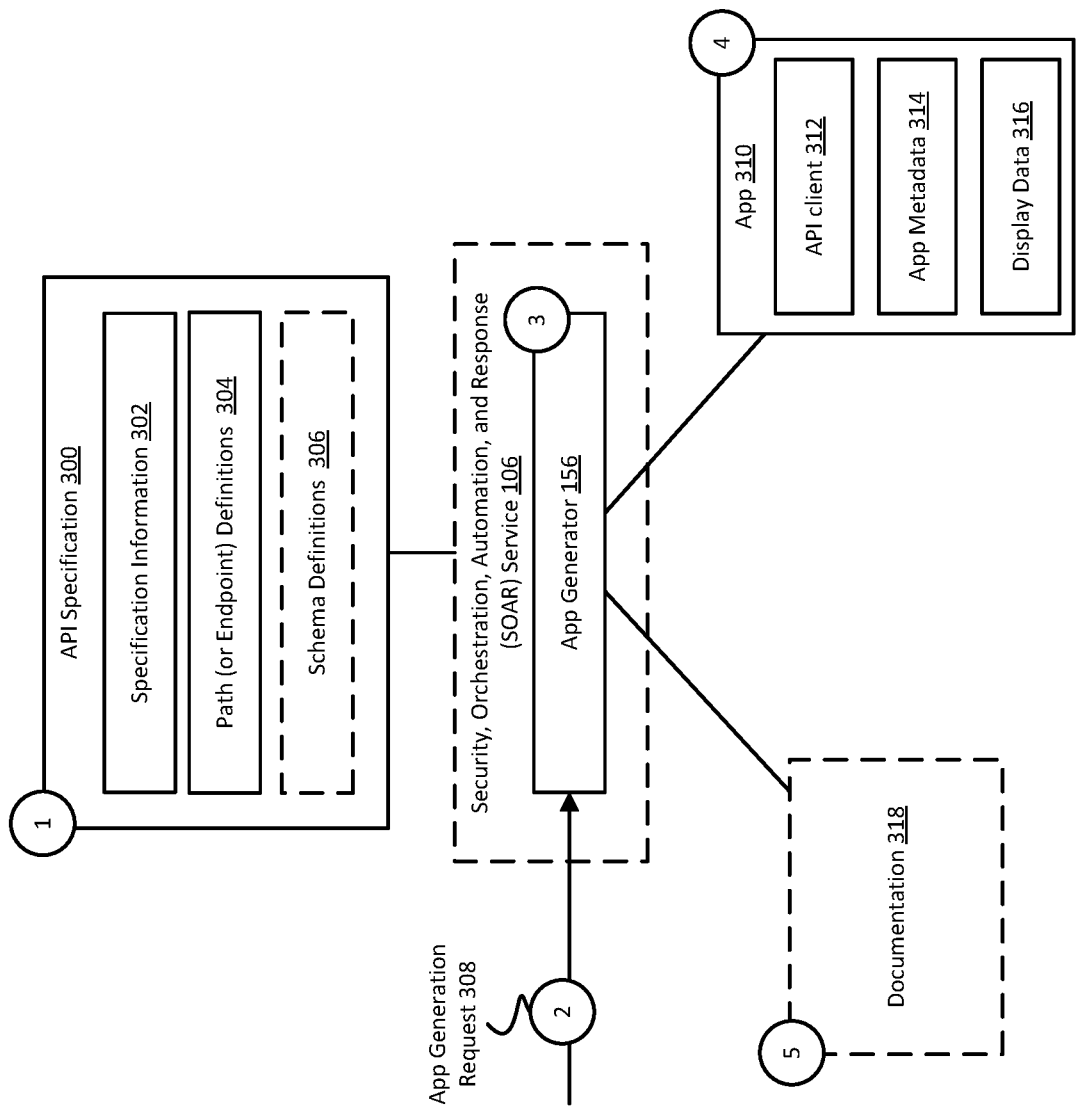
FIG. 3 is a diagram illustrating the use of a SOAR app generator to generate an app for a device or service based on an application programming interface (API) specification for the device or service according to some examples.

FIG. 3 is a diagram illustrating the use of a SOAR app generator to generate an app for a device or service based on an application programming interface (API) specification according to some examples. In FIG. 3, an API specification 300 is a resource (e.g., a text document or other type of data) that defines or describes an API or elements of an API. In some examples, an API specification 300 document conforms to a standard format such as the JSON or YAML format, although other formats can also be used. In general, the API specification 300 can be associated with an API for any device or service (e.g., a type of firewall, an external threat intelligence web service, etc.) related to a SOAR service 106 and for which a user desires the creation of an app to be used to integrate the related device or service with the SOAR service 106.

In general, an API specification 300 document can include several sections including, for example, specification information 302, paths (or endpoints) definitions 304, and optional schema definitions 306. A specification information 302 section of an API specification 300 contains metadata about the applicable API such as, for example, a title, version, and a description. A paths (or endpoints) definitions 304 section contains a description of the endpoints and operations of the API, along with information about parameters, request bodies, and responses associated with each of the endpoints. A schema definitions 306 section contains reusable definitions of schemas, parameters, responses, and other objects that can be referenced by the paths section or parts of the specification. At circle "1" in FIG. 3, a developer or other user can create an API specification 300 document for an API of interest using a text editor or other application used to specify some or all the data described above for the API.

At circle "2," an app generator 156 of a SOAR service 106, or as part of a standalone service or application, receives an app generation request 308 to generate an app for a device or service related to a SOAR service 106 based on the API specification 300. A user or process can generate the request 308 using a web-based console, using a GUI provided by the app generator 156, as a command-line argument used to invoke the application, or the like. In some examples, the request 308 specifies a location at which the app generator 156 can access data defining an API for the device or service (e.g., a storage location of the API specification 300, a URL at which the API specification 300 can be accessed, etc.) or includes the API specification 300 in the request 308.

As an example, consider a request identifying an API specification including the following snippet related to a pet store service providing actions related to the operation of a pet store:

```
. . .
/pets/{petId}:
  get:
    summary: Info for a specific pet
    operationId: showPetById
    description: "Learn about a specific pet"
    x-soar-connector-gen:
      displayName: "Show a pet"
      actionName: "show_pet"
      supportsAutomation: true
    tags:
  pets
    parameters:
  name: petID
  in: path
  required: true
  description: The id of the pet to retrieve
. . .
```

The snippet above includes information about an endpoint ("/pets/{petId}") including specification of the URL path of the resource represented by the endpoint. The endpoint definition further indicates the HTTP method that is used to access the resource (the HTTP GET method), a brief description of what the endpoint does (provides "Info for a specific pet"), a unique identifier of the operation associated with the endpoint ("showPetById"), and tags. The endpoint definition further includes specification of parameters, both required and optional, for the endpoint (e.g., a required "petId" parameter). In general, an API specification can include any number of such endpoint definitions depending on the types of actions and other functionality provided by an associated service. For example, the API specification for the example pet store service above might further define endpoints for updating a pet's information, finding a pet by status, updating a pet's status, uploading an image for a pet, and the like.

For actions that an app developer desires to expose in a visual playbook editor and other interfaces of a SOAR platform, in some examples, the developer can add specification extensions (sometimes alternatively referred to as vendor extensions) identifying those actions. A specification extension broadly provides a way for users to add custom fields to an API specification document. Referring again to the example above, the specification includes a "x-soar-connector-gen" extension providing additional information about how the endpoint is to be used in connection with the SOAR service 106. For example, the specification extension indicates a display name for the action ("Show a pet") that can be displayed in a visual playbook editor and other interfaces of the SOAR service 106, an action name "show_pet" for the endpoint, an indication of whether the action supports automation (e.g., as part of playbooks), among other possible information. In some examples, the data defining an API can include data indicating one or more action parameters to hide in a visual playbook editor interface.

At circle "3," the app generator 156 obtains the API specification 300 defining the API provided by the device or service and generates the app. The app generator 156 can create a local copy of the API specification 300 data or read the data from a remote storage location. In some examples, the generation of the app includes parsing the API specification 300 to identify actions defined by the specification, identifying specification extension information used to determine how an associated app is created, among other operations described in more detail below.

For example, at circles "4" and "5," the app generator 156 generates, based on the API specification 300 data defining the API, an app 310 to be used by a SOAR service 106 to execute functionality via the one or more endpoints associated with the API defined by the data, and optionally further generates documentation 318 associated with the app. In some examples, the SOAR app generator 156 generates the app 310 at least in part by generating source code that, upon execution, causes the SOAR service to generate API requests corresponding to the one or more endpoints associated with the API. Referring again to the example above of the API specification for a pet store service, the SOAR app generator 156 can generate API client 312 source code capable of sending requests to the "/pets/{petId}/" endpoint, and any other endpoints defined in the specification 300, upon invocation of a corresponding action by the SOAR service 106.

In some examples, the SOAR app generator 156 further generates app metadata 314 describing the app 310 (e.g., a name of the app, a version of the app, etc.) and functionality of the app (e.g., identifiers of one or more actions provided by the app), where the functionality can include actions corresponding to the endpoints defined by the API. The app metadata 314 can be used, for example, by a visual playbook editor service 166 or other components of the SOAR service 106 to identify and display available actions supported by the app, to display relevant information in association with corresponding action playbook blocks, to provide interface elements enabling users to input or configure values for input and output fields identified by the app metadata 314, and the like. The app generation process can further include the generation for display data 316 used to display other types of information related to the app such as interface components for displaying data returned by the app from an external service, an icon for the app, and so forth. The app generator 156 can optionally further generate documentation 318 describing how to install and use the app 310.

In some examples, an API specification can include specification of one or more static actions that can be executed by a corresponding app locally without interaction with the device or service to which the app relates. For example, a creator of the API specification 300 can include specification of one or more actions used to transform data provided to or returned by the corresponding device or service, used to return information about the app itself, or the like. The app generator 156 can generate such actions as part of the API client 312 code such that the static actions can be invoked via an action block in a visual playbook editor interface or other component of the SOAR service 106.

In some examples, an API specification can include data indicating an endpoint of the one or more endpoints to be used by the SOAR service 106 to test connectivity to the device or service. For example, using a specification extension or other syntax, a user can identify an endpoint enabling the SOAR service to determine whether the service is active or not. The SOAR service 106 can expose a button or other interface element that enables a user to test connectivity of an app and, upon selection, generate a call to the identified endpoint.

In some examples, the SOAR app generator 156 can optionally package the generated app artifacts (e.g., in a compressed file format, or any other format expected by a SOAR service 106) and provide the generated app artifacts for use by any user desiring to integrate the associated device or service with their instance of the SOAR service 106. For example, the SOAR app generator 156 can store the created app 310 in a storage location accessible to a user of the SOAR app generator 156 (e.g., so that the user can install the app when desired) or the SOAR app generator 156 can automatically install the app 310 in connection with a user's associated instance of the SOAR service 106 (e.g., by storing the app in a location expected by a user's instance of the SOAR service 106).

Complex Action Parameter Support in a Visual Playbook Editor

As indicated, apps can be used to extend the capabilities of a SOAR service 106 to execute actions supported by related devices and services. Furthermore, an app generator 156 service or application can be used to create apps for a SOAR service 106 from API specifications. In some cases, one or more actions associated with an app, whether created manually or by a SOAR app generator 156, include parameters associated with complex data types. For example, while some parameters to an action can include simple fields such as strings, numeric values, Boolean values, and the like, other actions involve parameters associated with more complex types of data including arrays of values (e.g., arbitrary length arrays of strings, numeric values, etc.), objects associated with unordered collections of values (e.g., an object including both a string value and a numeric value), arrays of objects, and objects including arrays. In existing visual playbook editors, limited support exists for enabling users to specify values for such input parameters (or action parameters) in a visual playbook editor in an intuitive way.

As one example of an action involving a complex input parameter, consider an action used to create an incident response plan. In this context, a response plan can broadly include an outline of steps to be taken in response to a security incident. The input used to create a response plan can involve input parameters such as, for example, a name of the response plan (a string value), a description of the response plan (a string value), and one or more phases (an array of objects, each object including several additional fields corresponding to information about a phase). In this example, each phase object might include a name (a string) and one or more tasks (again, an array of objects, each including several additional fields such as a task name, owner, description, etc.). In general, input parameters can include arbitrarily complex combinations of such arrays, objects, and object hierarchies depending on a type of action. And while such input parameters can be described, for example, in an API specification, the ability to display input fields and other interface elements for such parameters in a visual playbook editor presents several challenges due in part to the arbitrary length of arrays of values, number of object hierarchy levels, and so forth.

Examples described herein illustrate visual playbook editor interfaces capable of displaying complex parameters in a manner consistent with their definition in an API specification or elsewhere. The interface elements include, for example, interface elements enabling users to add or remove array values, to "drill down" into object layer hierarchies, and the like. Furthermore, upon receiving input from a user providing values for a complex parameter, the visual playbook editor can provide the parameter values to an associated app in a format expected by the app (e.g., using JSON dictionaries or other formats used to represent arrays and objects) so that the app can include the values in requests sent to a related device or service.

Figure 4:
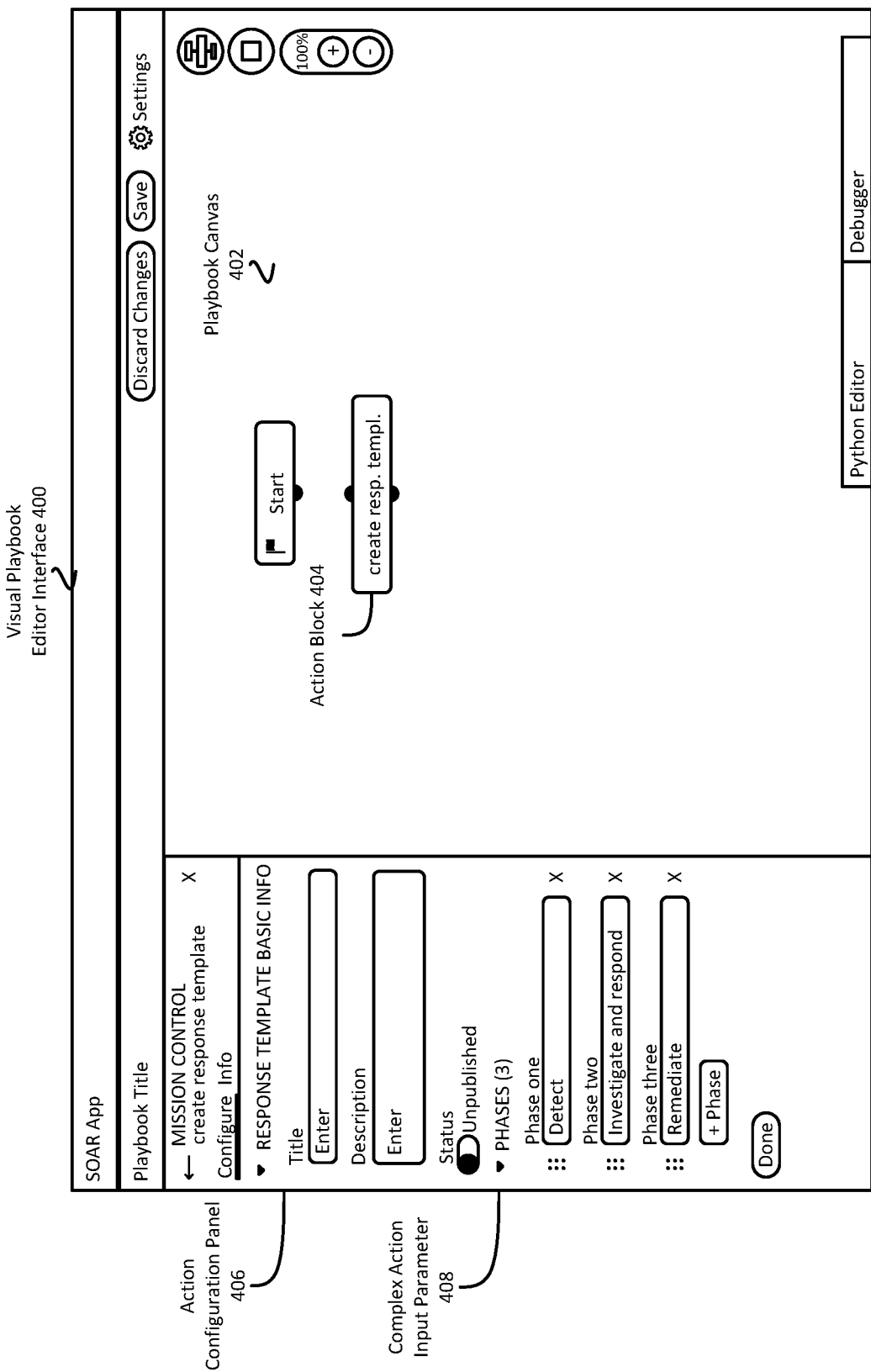
FIG. 4 illustrates an example graphical user interface including a visual playbook editor supporting complex action parameters according to some examples.

FIG. 4 illustrates an example graphical user interface including a visual playbook editor supporting complex action parameters according to some examples. As shown, the visual playbook editor interface 400 includes a playbook canvas 402 that can be used to create playbooks of selected action blocks. In the example of FIG. 4, a user has added an action block 404 corresponding to an action for creating a response template. In association with the action block 404, the visual playbook editor interface further displays an action configuration panel 406 used to specify values for input parameters associated with the action block 404. The action configuration panel 406 for the action block 404 includes interface elements, e.g., for providing a first string value corresponding to a title of the response template and a second string value corresponding to a description of the response template.

FIG. 4 further illustrates interface elements used to enable users to provide values for a complex action input parameter 408. In this example, the create response template action block 404 is associated with an array of objects, each object corresponding to a "phase" associated with the response template. As shown, a user can add any number of phases as desired, using the "+Phase" button to add additional phases as desired. A user can also remove phases if needed. The interface elements for the array of phase objects in this example includes a text identifier of each of the phases, which can be configured using additional interfaces shown in subsequent figures. In some examples, the visual playbook editor interface 400 automatically displays the appropriate types of interface elements for input parameter types from strings, numerical values, arrays, and objects based on information about the action added to the visual playbook editor interface 400. As indicated above, the specification of the input parameter types for each action can be based on metadata associated with the app, where the metadata can be generated manually by an app developer or by an app generator 156. In the case of the app generator 156, the action information can be generated automatically based on information about the input and output parameters specified in a corresponding API specification.

Figure 5:
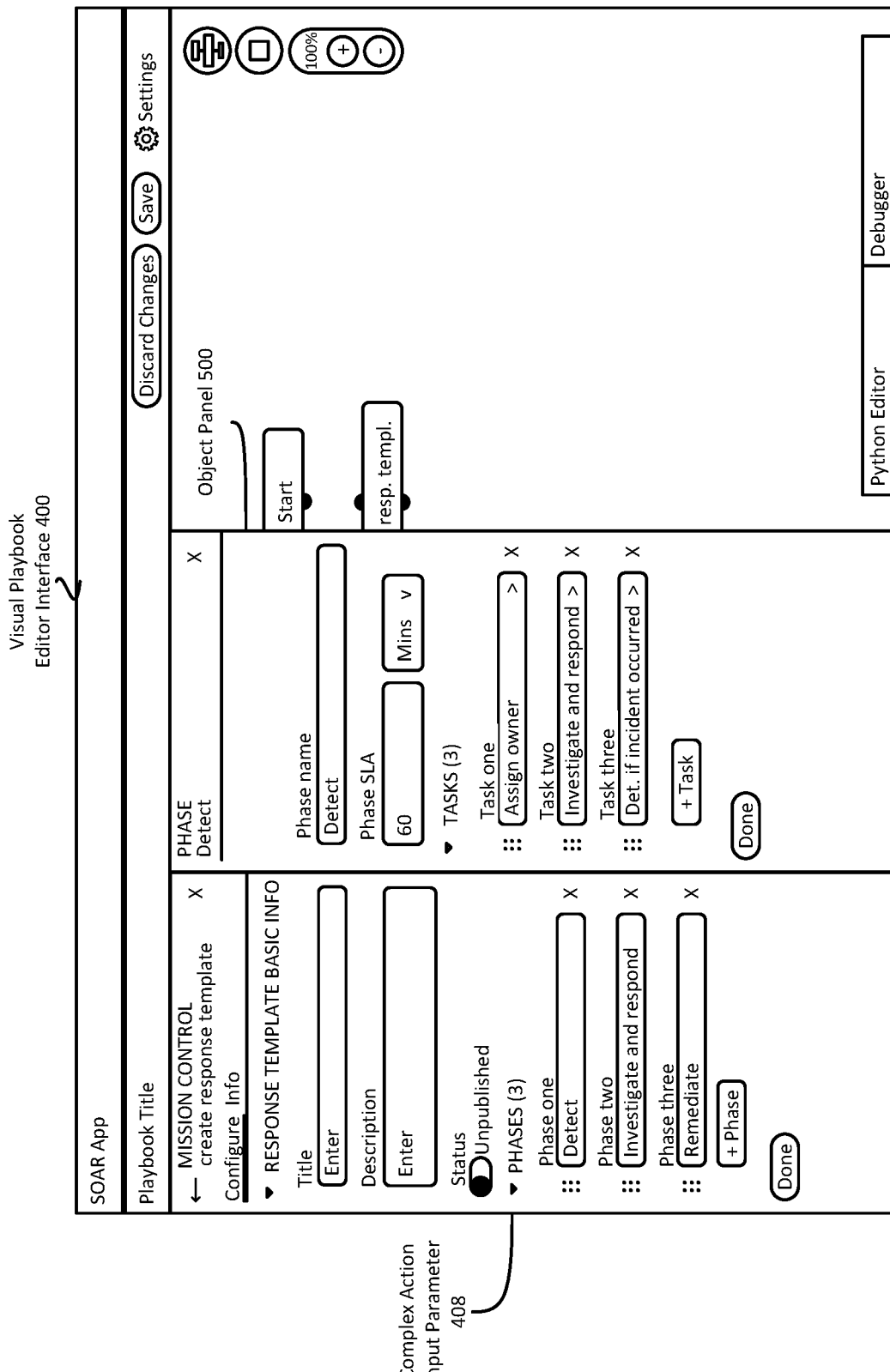
FIG. 5 illustrates the display of an object panel in a visual playbook editor supporting complex action parameters according to some examples.

FIG. 5 illustrates the display of an object panel in a visual playbook editor supporting complex action parameters according to some examples. In this example, a user has selected one of the phases displayed as part of the complex action input parameter 408 (the phase one named "Detect") and, in the response, the visual playbook editor interface 400 causes display of the object panel 500. Here, the object panel 500 includes additional input fields corresponding to name-value pairs associated with a phase object including, e.g., a string value corresponding to a phase name, a numerical value indicating a phase service level agreement (SLA), and an array of task objects. As illustrated by this example, an object parameter can further include one or more object parameters, thereby creating multi-level hierarchies of objects depending on the particulars of a given action.

Figure 6:
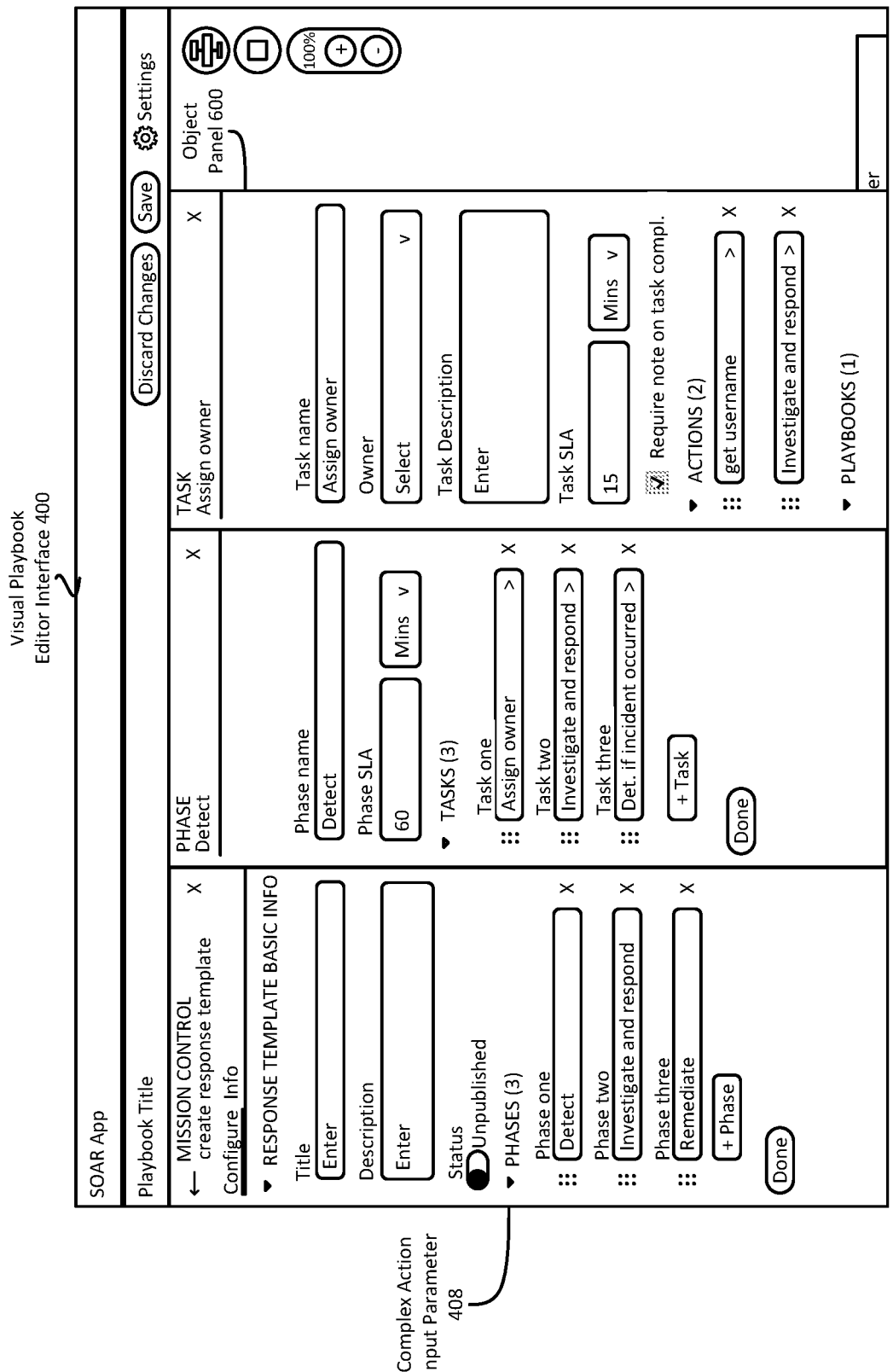
FIG. 6 illustrates the display of multiple panels for a hierarchy of objects in a visual playbook editor supporting complex action parameters according to some examples.

FIG. 6 illustrates the display of multiple panels for a hierarchy of objects in a visual playbook editor supporting complex action parameters according to some examples. To illustrate multiple levels of an object hierarchy, as described above, the visual playbook editor interface 400 shown in FIG. 6 further includes an object panel 600 displayed, for example, responsive to a user selecting one of the interface elements representing a task in the object panel 500. The object panel 600, for example, includes additional input fields associated with a task including, e.g., a task name, an owner, a task description. The input fields for a task further include an array of action objects, which can be further configured in a similar manner. As shown, the visual playbook editor interfaces generally enable users to configure arrays using a vertical expansion of array fields as needed, and further enable users to configure any number of levels of an object hierarchy with a horizontally expanding set of object panels.

In some examples, the SOAR service 106 enables a visual playbook editor service 166 to dynamically populate fields for input parameters associated with enumerated lists of values. For example, a user can specify, in association with an endpoint, a specification extension or other API specification component identifying an endpoint or other type of hook that enables the visual playbook editor service 166 to request a list of possible values for an input parameter. For example, for an example input parameter associated with a status for an incident, an app developer can provide an API endpoint from which a list of possible statuses can be obtained. The visual playbook editor service 166 can then obtain the list on demand and display the possible values in a visual playbook editor, where the list of possible values can be different for each user of the related device or service.

FIG. 7 is a flowchart illustrating an example process 700 for a SOAR service to automatically manage apps used to integrate the SOAR service with a related device or service according to examples. The example process 700 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively or additionally, the process 700 can be implemented using a non-transitory computer-readable medium storing instructions that, when executed by one or more processors, case the one or more processors to perform the operations of the process 700 of FIG. 7.

The process 700 includes, at block 702, obtaining, by a security, orchestration, and automated response (SOAR) service, an identifier of an app for a device or service related to the SOAR service, wherein the SOAR service automates responses to security and operational incidents occurring in information technology (IT) environments, wherein the device or service provides functionality executable by the SOAR service via an application programming interface (API), and wherein the app implements a client interface to the API provided by the device or service;

The process 700 further includes, at block 704, determining, by the SOAR service, that the app is not installed in association with the SOAR service;

The process 700 further includes, at block 706, installing, by the SOAR service, the app by: obtaining the app from an app repository, and storing the app at a storage location accessible to the SOAR service;

The process 700 further includes, at block 708, receiving, by the SOAR service, a request to execute an action defined by the app, wherein the action corresponds to an endpoint defined by the API provided by the device or service;

The process 700 further includes, at block 710, sending, via the client interface implemented by the app, a request to the endpoint defined by the API to execute the action; and The process 700 further includes, at block 712, receiving a result from the device or service based on execution of the action.

In some examples, the device or service is an integrated security operations service, and wherein the app provides a set of actions related to security or operational threat detection and investigation.

In some examples, the app is a first version of the app, wherein the first version of the app provides a first set of actions, and wherein the process further includes: obtaining, from the device or service, an identifier of an updated version of the app for the device or service, wherein the updated version of the app includes a second set of actions that is different from the first set of actions; obtaining, by the SOAR service, the updated version of the app from the app repository; and using the updated version of the app to execute an action from the second set of actions.

In some examples, the process further includes receiving, from the device or service, an access token for authenticating requests sent to the device or service via the API; and configuring the app to use the access token for requests sent from the SOAR service to the device or service, wherein the request sent to the device or service to execute the action includes the access token.

In some examples, the process further includes receiving a request to launch the SOAR service; launching the SOAR service on one or more computing resources provisioned within a cloud provider network; providing the SOAR service with a Uniform Resource Locator (URL) corresponding to the device or service; sending, by the SOAR service and via the URL, a request to establish a pairing between the SOAR service and the device or service; and receiving, from the device or service, a response to the request to establish a pairing between the SOAR service and the device or service, wherein the response includes the identifier of the app.

In some examples, the app is associated with a first version, and wherein the process further includes: receiving, by the SOAR service, a first request including a first access token for authenticating requests sent to the device or service; receiving, by the SOAR service, a second request including a second access token to replace the first access token, wherein the second request further includes an identifier of a second version of the app for the device or service; determining that the second version of the app is different from the first version; and installing, by the SOAR service, the second version of the app.

In some examples, the client interface implements a Hypertext Transfer Protocol (HTTP) API client that generates network requests to endpoints defined by the device or service for executing a set of actions defined by the API provided by the device or service.

In some examples, the request to execute the action is generated during execution of a playbook by the SOAR service, and wherein the playbook includes an action block corresponding to the action.

In some examples, the process further includes providing, by the SOAR service, the result from the device or service to one or more downstream action blocks of a playbook.

In some examples, the device or service is an actions service of the SOAR service, and wherein a set of actions provided by the actions service correspond to operations performed by the SOAR service.

Figure 8:
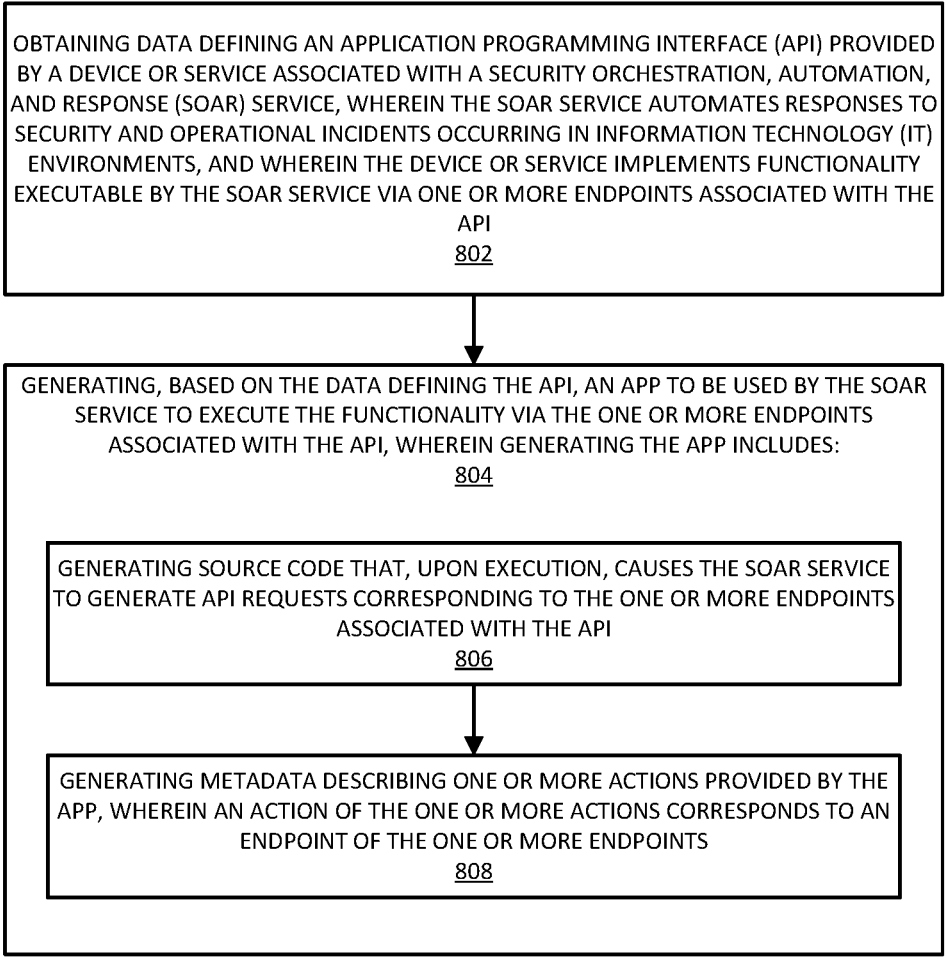
FIG. 8 is a flow diagram illustrating operations of a method in which a SOAR app generator generates an app for a device or service based on an application programming interface (API) specification for the device or service according to some examples.

FIG. 8 is a flowchart illustrating an example process 800 for generating a SOAR service app based on API specification according to some examples. The example process 800 can be implemented, for example, by a computing device that comprises a processor and a non-transitory computer-readable medium. The non-transitory computer readable medium can be storing instructions that, when executed by the processor, can cause the processor to perform the operations of the illustrated process 800. Alternatively or additionally, the process 800 can be implemented using a non-transitory computer-readable medium storing instructions that, when executed by one or more processors, case the one or more processors to perform the operations of the process 800 of FIG. 8.

The process 800 includes, at block 802, obtaining data defining an application programming interface (API) provided by a device or service associated with a security orchestration, automation, and response (SOAR) service, wherein the SOAR service automates responses to security and operational incidents occurring in information technology (IT) environments, and wherein the device or service implements functionality executable by the SOAR service via one or more endpoints associated with the API; and The process 800 further includes, at block 804, generating, based on the data defining the API, an app to be used by the SOAR service to execute the functionality via the one or more endpoints associated with the API.

The process 800 further includes, at block 806, generating source code that, upon execution, causes the SOAR service to generate API requests corresponding to the one or more endpoints associated with the API, and The process 800 further includes, at block 808, generating metadata describing one or more actions provided by the app, wherein an action of the one or more actions corresponds to an endpoint of the one or more endpoints.

In some examples, the process further includes receiving, by an app generation service, a request to generate the app, wherein the request includes an identifier of the data defining the API; and storing the app in an app repository.

In some examples, the data defining the API includes, in association with a definition of an endpoint of the one or more endpoints, data indicating how to display an action corresponding to the endpoint in a visual playbook editor interface of the SOAR service.

In some examples, the data defining the API includes, in association with a definition of an endpoint of the one or more endpoints, data indicating one or more action parameters associated with the endpoint, and wherein the SOAR service displays, in a visual playbook editor interface, interface elements corresponding to the action parameters.

In some examples, the data defining the API includes, in association with a definition of an endpoint of the one or more endpoints, a property indicating information used to display an action corresponding to the endpoint in a visual playbook editor interface, and wherein the property is specified using a specification extension property.

In some examples, the data defining the API includes data indicating an endpoint of the one or more endpoints to be used by the SOAR service to test connectivity to the device or service.

In some examples, the data defining the API includes, in association with a definition of an endpoint of the one or more endpoints, data indicating one or more action parameters associated with the endpoint, and wherein the data indicating the one or more action parameters associated with the endpoint further includes an indication to hide an action parameter of the one or more action parameters in a visual playbook editor interface of the SOAR service.

In some examples, generating the app further includes incorporating the source code into a source code template implementing additional app functionality.

In some examples, the data defining the API further includes specification of a static action, and wherein the static action is executable by the SOAR service locally without interaction with the device or service.

In some examples, the process further includes installing the app in association with an instance of the SOAR service.

FIG. 9 is a flowchart illustrating an example process 900 for a visual playbook editor to display interface elements enabling users to specify values for complex input parameter types according to some examples. The example process 900 can be implemented, for example, by a computing device that comprises a processor and a non-transitory computer-readable medium. The non-transitory computer readable medium can be storing instructions that, when executed by the processor, can cause the processor to perform the operations of the illustrated process 700. Alternatively or additionally, the process 900 can be implemented using a non-transitory computer-readable medium storing instructions that, when executed by one or more processors, case the one or more processors to perform the operations of the process 900 of FIG. 9.

The process 900 includes, at block 902, receiving, by a visual playbook editor interface of a security, orchestration, and automated response (SOAR) service, a request to add an action block to a playbook under development in the visual playbook editor interface, wherein the action block identifies an action to be performed by the SOAR service upon encountering the action block during execution of the playbook, and wherein the action is implemented in part by an app providing a client interface to an application programming interface (API) for a device or service related to the SOAR service;

The process 900 includes, at block 904, identifying, based on data describing actions provided by the app, an input parameter associated with the action block, wherein the data indicates that the input parameter is one of: an array representing an ordered collection of values, or an object representing an unordered collection of name-value pairs;

The process 900 includes, at block 906, causing display, in the visual playbook editor interface, of one or more graphical interface elements corresponding to the input parameter;

The process 900 includes, at block 908, receiving, via the one or more graphical interface elements, one or more input values for the input parameter;

The process 900 includes, at block 910, generating a representation of the one or more input values according to a data interchange format; and The process 900 includes, at block 912, providing, to the app, the representation of the one or more input values.

In some examples, the data describing the actions provided by the app is generated by an app generator service based on an API specification for the device or service.

In some examples, the input parameter is an array, and the process further includes: receiving, via the visual playbook editor interface, input requesting to increase a number of graphical interface elements displayed for providing input parameter values; and causing display of an additional graphical interface element for providing input parameter values.

In some examples, the input parameter is an object representing an unordered collection of name-value pairs, wherein the visual playbook editor interface includes a first graphical interface element representing the object, and the process further includes: receiving, via the visual playbook editor interface, input selecting the first graphical interface element representing the object; causing display, in the visual playbook editor interface, of a second graphical interface element including input fields for providing values associated with name-value pairs of the unordered collection of name-value pairs represented by the object; and receiving, via the input fields, values for the name-value pairs of the unordered collection of name-value pairs represented by the object.

In some examples, wherein the input parameter is an array representing an ordered collection of values, and wherein the ordered collection of values includes a plurality of objects.

In some examples, the input parameter is an object, and wherein the object includes an array of values.

In some examples, the input parameter is a first object representing a first unordered collection of name-value pairs, wherein the first object includes a second object, and wherein the second object includes a second unordered collection of name-value pairs.

In some examples, the input parameter is an array, and wherein a value in the array is one of: a string, a number, a Boolean, or a null value.

In some examples, the input parameter is a first input parameter, and wherein the method further comprises obtaining, by the SOAR service, an enumerated list of values from the device or service for a second input parameter, wherein the enumerated list of values is obtained via an endpoint defined by the app.

In some examples, the process further includes sending, by the app, a request to the device or service to execute the action, wherein the request includes the representation of the one or more input values.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 10:
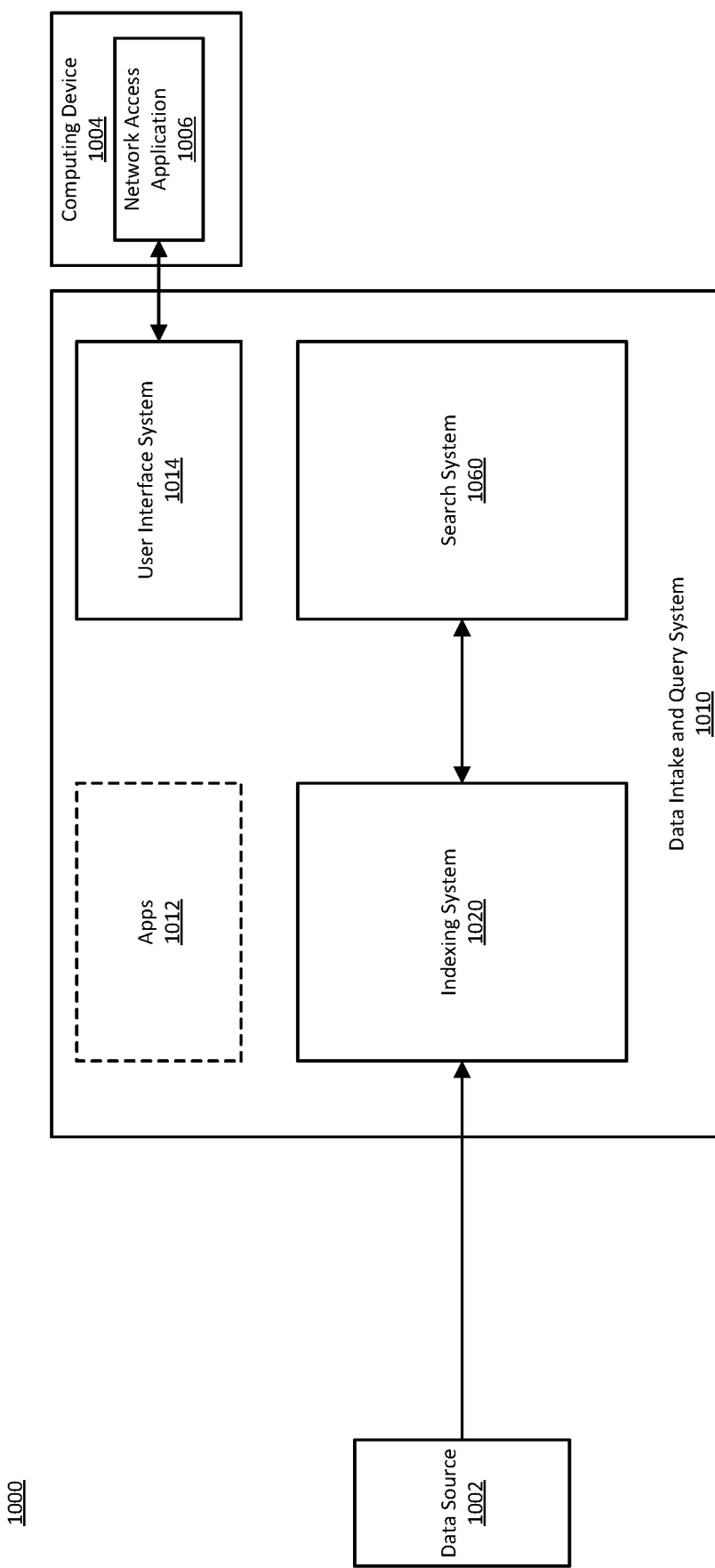
FIG. 10 is a block diagram illustrating in greater detail an example of an indexing system of a data intake and query system according to some examples.

FIG. 10 is a block diagram illustrating an example computing environment 1000 that includes a data intake and query system 1010. The data intake and query system 1010 obtains data from a data source 1002 in the computing environment 1000, and ingests the data using an indexing system 1020. A search system 1060 of the data intake and query system 1010 enables users to navigate the indexed data. Though drawn with separate boxes, in some implementations the indexing system 1020 and the search system 1060 can have overlapping components. A computing device 1004, running a network access application 1006, can communicate with the data intake and query system 1010 through a user interface system 1014 of the data intake and query system 1010. Using the computing device 1004, a user can perform various operations with respect to the data intake and query system 1010, such as administration of the data intake and query system 1010, management and generation of "knowledge objects," initiating of searches, and generation of reports, among other operations. The data intake and query system 1010 can further optionally include apps 1012 that extend the search, analytics, and/or visualization capabilities of the data intake and query system 1010.

The data intake and query system 1010 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1010 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1010 can execute on a single computing device, or may be distributed over multiple computing devices. For example, the program code can include instructions for executing both indexing and search components (which may be part of the indexing system 1020 and/or the search system 1060, respectively), and can be executed on a computing device that also provides the data source 1002. As another example, the program code can execute on one computing device, where the program code executes both indexing and search components, while another copy of the program code executes on a second computing device that provides the data source 1002. As another example, the program code can execute only an indexing component or only a search component. In this example, a first instance of the program code that is executing the indexing component and a second instance of the program code that is executing the search component can be executing on the same computing device or on different computing devices.

The data source 1002 of the computing environment 1000 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1002 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1020 obtains machine date from the data source 1002 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1020 does not require prior knowledge of the structure of incoming data (e.g., the indexing system 1020 does not need to be provided with a schema describing the data). Additionally, the indexing system 1020 retains a copy of the data as it was received by the indexing system 1020 such that the original data is always available for searching (e.g., no data is discarded, though, in some examples, the indexing system 1020 can be configured to do so).

The search system 1060 searches the data stored by the indexing 1020 system. As discussed in greater detail below, the search system 1060 enables users associated with the computing environment 1000 (and possibly also other users) to navigate the data, generate reports, and visualize results in "dashboards" output using a graphical interface. Using the facilities of the search system 1060, users can obtain insights about the data, such as retrieving events from an index, calculating metrics, searching for specific conditions within a rolling time window, identifying patterns in the data, and predicting future trends, among other examples. To achieve greater efficiency, the search system 1060 can apply map-reduce methods to parallelize searching of large volumes of data. Additionally, because the original data is available, the search system 1060 can apply a schema to the data at search time. This allows different structures to be applied to the same data, or for the structure to be modified if or when the content of the data changes. Application of a schema at search time may be referred to herein as a late-binding schema technique.

The user interface system 1014 provides mechanisms through which users associated with the computing environment 1000 (and possibly others) can interact with the data intake and query system 1010. These interactions can include configuration, administration, and management of the indexing system 1020, initiation and/or scheduling of queries to the search system 1060, receipt or reporting of search results, and/or visualization of search results. The user interface system 1014 can include, for example, facilities to provide a command line interface or a web-based interface.

Users can access the user interface system 1014 using a computing device 1004 that communicates with data intake and query system 1010, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1000. For example, a person can log in as a particular user and, using the user's digital information, can access the data intake and query system 1010. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1004 can provide a human-machine interface through which a person can have a digital presence in the computing environment 1000 in the form of a user. The computing device 1004 is an electronic device having one or more processors and a memory capable of storing instructions for execution by the one or more processors. The computing device 1004 can further include input/output (I/O) hardware and a network interface. Applications executed by the computing device 1004 can include a network access application 1006, which can a network interface of the client computing device 1004 to communicate, over a network, with the user interface system 1014 of the data intake and query system 1010. The user interface system 1014 can use the network access application 1006 to generate user interfaces that enable a user to interact with the data intake and query system 1010. A web browser is one example of a network access application. A shell tool can also be used as a network access application. In some examples, the data intake and query system 1010 is an application executing on the computing device 1004. In such examples, the network access application 1006 can access the user interface system 1014 without needing to go over a network.

The data intake and query system 1010 can optionally include apps 1012. An app of the data intake and query system 1010 is a collection of configurations, knowledge objects (a user-defined entity that enriches the data in the data intake and query system 1010), views, and dashboards that may provide additional functionality, different techniques for searching the data, and/or additional insights into the data. The data intake and query system 1010 can execute multiple applications simultaneously. Example applications include an information technology service intelligence application, which can monitor and analyze the performance and behavior of the computing environment 1000, and an enterprise security application, which can include content and searches to assist security analysts in diagnosing and acting on anomalous or malicious behavior in the computing environment 1000.

Though FIG. 10 illustrates only one data source, in practical implementations, the computing environment 1000 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1000, the data intake and query system 1010 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1000 can include on-prem and cloud-based computing resources, or only cloud-based resources. For example, an entity may have on-prem computing devices and a private cloud. In this example, the entity operates the data intake and query system 1010 and can choose to execute the data intake and query system 1010 on an on-prem computing device or in the cloud. In another example, a provider entity operates the data intake and query system 1010 in a public cloud and provides the functionality of the data intake and query system 1010 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 1010. In some implementations, the entity providing the data intake and query system 1010 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1010, and a third entity can subscribe to the services of the second provider entity in order to use the functionality of the data intake and query system 1010. In this example, the data sources are associated with the third entity, users accessing the data intake and query system 1010 are associated with the third entity, and the analytics and insights provided by the data intake and query system 1010 are for purposes of the third entity's operations.

Figure 11:
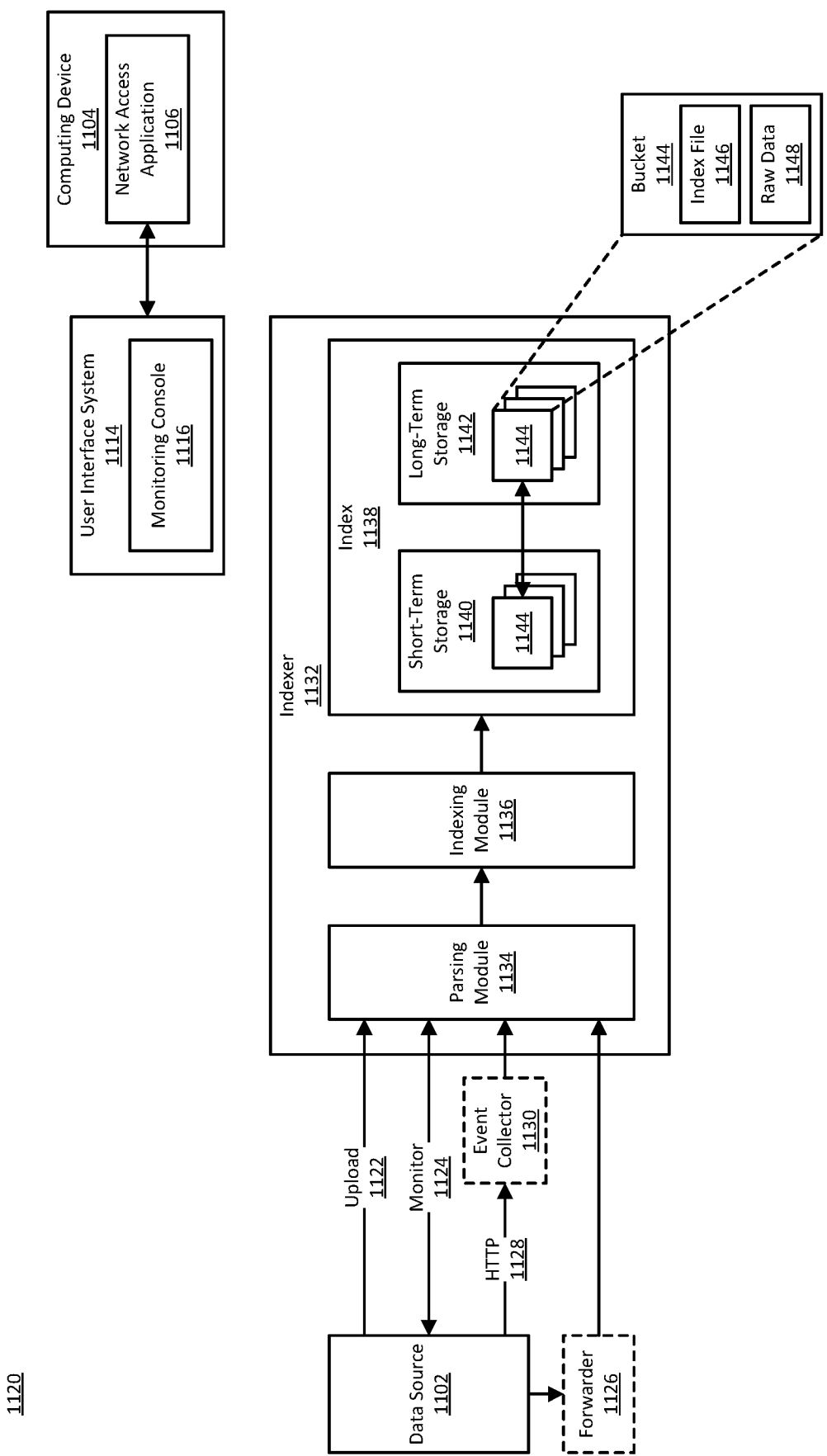
FIG. 11 is a block diagram illustrating in greater detail an example of the search system of a data intake and query system according to some examples.

FIG. 11 is a block diagram illustrating in greater detail an example of an indexing system 1120 of a data intake and query system, such as the data intake and query system 1010 of FIG. 10. The indexing system 1120 of FIG. 11 uses various methods to obtain machine data from a data source 1102 and stores the data in an index 1138 of an indexer 1132. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1120 enables the data intake and query system to obtain the machine data produced by the data source 1102 and to store the data for searching and retrieval.

Users can administer the operations of the indexing system 1120 using a computing device 1104 that can access the indexing system 1120 through a user interface system 1114 of the data intake and query system. For example, the computing device 1104 can be executing a network access application 1106, such as a web browser or a terminal, through which a user can access a monitoring console 1116 provided by the user interface system 1114. The monitoring console 1116 can enable operations such as: identifying the data source 1102 for indexing; configuring the indexer 1132 to index the data from the data source 1102; configuring a data ingestion method; configuring, deploying, and managing clusters of indexers; and viewing the topology and performance of a deployment of the data intake and query system, among other operations. The operations performed by the indexing system 1120 may be referred to as "index time" operations, which are distinct from "search time" operations that are discussed further below.

The indexer 1132, which may be referred to herein as a data indexing component, coordinates and performs most of the index time operations. The indexer 1132 can be implemented using program code that can be executed on a computing device. The program code for the indexer 1132 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1132. In some implementations, the indexer 1132 executes on the computing device 1104 through which a user can access the indexing system 1120. In some implementations, the indexer 1132 executes on a different computing device.

The indexer 1132 may be executing on the computing device that also provides the data source 1102 or may be executing on a different computing device. In implementations wherein the indexer 1132 is on the same computing device as the data source 1102, the data produced by the data source 1102 may be referred to as "local data." In other implementations the data source 1102 is a component of a first computing device and the indexer 1132 executes on a second computing device that is different from the first computing device. In these implementations, the data produced by the data source 1102 may be referred to as "remote data." In some implementations, the first computing device is "on-prem" and in some implementations the first computing device is "in the cloud." In some implementations, the indexer 1132 executes on a computing device in the cloud and the operations of the indexer 1132 are provided as a service to entities that subscribe to the services provided by the data intake and query system.

For a given data produced by the data source 1102, the indexing system 1120 can be configured to use one of several methods to ingest the data into the indexer 1132. These methods include upload 1122, monitor 1124, using a forwarder 1126, or using HyperText Transfer Protocol (HTTP 1128) and an event collector 1130. These and other methods for data ingestion may be referred to as "getting data in" (GDI) methods.

Using the upload 1122 method, a user can instruct the indexing system to specify a file for uploading into the indexer 1132. For example, the monitoring console 1116 can include commands or an interface through which the user can specify where the file is located (e.g., on which computing device and/or in which directory of a file system) and the name of the file. Once uploading is initiated, the indexer 1132 processes the file, as discussed further below. Uploading is a manual process and occurs when instigated by a user. For automated data ingestion, the other ingestion methods are used.

The monitor 1124 method enables the indexing system 1132 to monitor the data source 1102 and continuously or periodically obtain data produced by the data source 1102 for ingestion by the indexer 1132. For example, using the monitoring console 1116, a user can specify a file or directory for monitoring. In this example, the indexing system 1132 can execute a monitoring process that detects whenever data is added to the file or directory and causes the data to be sent to the indexer 1132. As another example, a user can specify a network port for monitoring. In this example, a monitoring process can capture data received at or transmitting from the network port and cause the data to be sent to the indexer 1132. In various examples, monitoring can also be configured for data sources such as operating system event logs, performance data generated by an operating system, operating system registries, operating system directory services, and other data sources.

Monitoring is available when the data source 1102 is local to the indexer 1132 (e.g., the data source 1102 is on the computing device where the indexer 1132 is executing). Other data ingestion methods, including forwarding and the event collector 1130, can be used for either local or remote data sources.

A forwarder 1126, which may be referred to herein as a data forwarding component, is a software process that sends data from the data source 1102 to the indexer 1132. The forwarder 1126 can be implemented using program code that can be executed on the computer device that provides the data source 1102. A user launches the program code for the forwarder 1126 on the computing device that provides the data source 1102. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1126 can provide various capabilities. For example, the forwarder 1126 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 1126 can break the data into individual events (event generation is discussed further below) and send the events to a receiver. Other operations that the forwarder 1126 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1130 provides an alternate method for obtaining data from the data source 1102. The event collector 1130 enables data and application events to be sent to the indexer 1132 using HTTP 1128. The event collector 1130 can be implemented using program code that can be executing on a computing device. The program code may be a component of the data intake and query system or can be a standalone component that can be executed independently of the data intake and query system and operates in cooperation with the data intake and query system.

To use the event collector 1130, a user can, for example using the monitoring console 1116 or a similar interface provided by the user interface system 1114, enable the event collector 1130 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1102 as an alternative method to using a username and password for authentication.

To send data to the event collector 1130, the data source 1102 is supplied with a token and can then send HTTP 1128 requests to the event collector 1130. To send HTTP 1128 requests, the data source 1102 can be configured to use an HTTP client and/or to use logging libraries such as those supplied by Java, JavaScript, and .NET libraries. An HTTP client enables the data source 1102 to send data to the event collector 1130 by supplying the data, and a Uniform Resource Identifier (URI) for the event collector 1130 to the HTTP client. The HTTP client then handles establishing a connection with the event collector 1130, transmitting a request containing the data, closing the connection, and receiving an acknowledgment if the event collector 1130 sends one. Logging libraries enable HTTP 1128 requests to the event collector 1130 to be generated directly by the data source. For example, an application can include or link a logging library, and through functionality provided by the logging library manage establishing a connection with the event collector 1130, transmitting a request, and receiving an acknowledgement.

An HTTP 1128 request to the event collector 1130 can contain a token, a channel identifier, event metadata, and/or event data. The token authenticates the request with the event collector 1130. The channel identifier, if available in the indexing system 1120, enables the event collector 1130 to segregate and keep separate data from different data sources. The event metadata can include one or more key-value pairs that describe the data source 1102 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1130 extracts events from HTTP 1128 requests and sends the events to the indexer 1132. The event collector 1130 can further be configured to send events or event data to one or more indexers. Extracting the events can include associating any metadata in a request with the event or events included in the request. In these implementations, event generation by the indexer 1132 (discussed further below) is bypassed, and the indexer 1132 moves the events directly to indexing. In some implementations, the event collector 1130 extracts event data from a request and outputs the event data to the indexer 1132, and the indexer generates events from the event data. In some implementations, the event collector 1130 sends an acknowledgement message to the data source 1102 to indicate that the event collector 1130 has received a particular request form the data source 1102, and/or to indicate to the data source 1102 that events in the request have been added to an index.

The indexer 1132 ingests incoming data and transforms the data into searchable knowledge in the form of events. In the data intake and query system, an event is a single piece of data that represents activity of the component represented in FIG. 11 by the data source 1102. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1132 can include a parsing module 1134 and an indexing module 1136 for generating and storing the events. The parsing module 1134 and indexing module 1136 can be modular and pipelined, such that one component can be operating on a first set of data while the second component is simultaneously operating on a second set of data. Additionally, the indexer 1132 may at any time have multiple instances of the parsing module 1134 and indexing module 1136, with each set of instances configured to simultaneously operate on data from the same data source or from different data sources. The parsing module 1134 and indexing module 1136 are illustrated to facilitate discussion, with the understanding that implementations with other components are possible to achieve the same functionality.

The parsing module 1134 determines information about event data, where the information can be used to identify events within the event data. For example, the parsing module 1134 can associate a source type with the event data.

A source type identifies the data source 1102 and describes a possible data structure of event data produced by the data source 1102. For example, the source type can indicate which fields to expect in events generated at the data source 1102 and the keys for the values in the fields, and possibly other information such as sizes of fields, an order of the fields, a field separator, and so on. The source type of the data source 1102 can be specified when the data source 1102 is configured as a source of event data. Alternatively, the parsing module 1134 can determine the source type from the event data, for example from an event field or using machine learning.

Other information that the parsing module 1134 can determine includes timestamps. In some cases, an event includes a timestamp as a field, and the timestamp indicates a point in time when the action represented by the event occurred or was recorded by the data source 1102 as event data. In these cases, the parsing module 1134 may be able to determine from the source type associated with the event data that the timestamps can be extracted from the events themselves. In some cases, an event does not include a timestamp and the parsing module 1134 determines a timestamp for the event, for example from a name associated with the event data from the data source 1102 (e.g., a file name when the event data is in the form of a file) or a time associated with the event data (e.g., a file modification time). As another example, when the parsing module 1134 is not able to determine a timestamp from the event data, the parsing module 1134 may use the time at which it is indexing the event data. As another example, the parsing module 1134 can use a user-configured rule to determine the timestamps to associate with events.

The parsing module 1134 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1134 may be able to determine event boundaries from the source type associated with the event data, for example from a data structure indicated by the source type. In some implementations, a user can configure rules the parsing module 1134 can use to identify event boundaries.

The parsing module 1134 can further extract data from events and possibly also perform transformations on the events. For example, the parsing module 1134 can extract a set of fields for each event, such as a host or hostname, source or source name, and/or source type. The parsing module 1134 may extract certain fields by default or based on a user configuration. Alternatively or additionally, the parsing module 1134 may add fields to events, such as a source type or a user-configured field. As another example of a transformation, the parsing module 1134 can anonymize fields in events to mask sensitive information, such as social security numbers or account numbers. Anonymizing fields can include changing or replacing values of specific fields. The parsing component 1134 can further perform user-configured transformations.

The parsing module 1134 outputs the results of processing incoming event data to the indexing module 1136, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1132 can be configured to identify searchable segments that are parts of fields, searchable segments that are entire fields, or both. The parsing module 1134 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 1146, to find event data that matches a search query. In some implementations, segmentation can alternatively be performed by the forwarder 1126. Segmentation can also be disabled, in which case the indexer 1132 will not build a lexicon for the event data. When segmentation is disabled, the search system searches the event data directly.

Building index data structures generates the index 1138. The index 1138 is a storage data structure on a storage device (e.g., a disk drive or other physical device for storing digital data). The storage device may be a component of the computing device on which the indexer 1132 is operating (referred to herein as local storage) or may be a component of a different computing device (referred to herein as remote storage) that the indexer 1138 has access to over a network. The indexer 1132 can include more than one index and can include indexes of different types. For example, the indexer 1132 can include event indexes, which impose minimal structure on stored data and can accommodate any type of data. As another example, the indexer 1132 can include metrics indexes, which use a highly structured format to handle the higher volume and lower latency demands associated with metrics data.

The indexing module 1136 organizes files in the index 1138 in directories referred to as buckets. The files in a bucket 1144 can include raw data files, index files, and possibly also other metadata files. As used herein, "raw data" means data as when the data was produced by the data source 1102, without alteration to the format or content. As noted previously, the parsing component 1134 may add fields to event data and/or perform transformations on fields in the event data, and thus a raw data file 1148 can include, in addition to or instead of raw data, what is referred to herein as enriched raw data. The raw data file 1148 may be compressed to reduce disk usage. An index file 1146, which may also be referred to herein as a "time-series index" or tsidx file, contains metadata that the indexer 1132 can use to search a corresponding raw data file 1148. As noted above, the metadata in the index file 1146 includes a lexicon of the event data, which associates each unique keyword in the event data in the raw data file 1148 with a reference to the location of event data within the raw data file 1148. The keyword data in the index file 1146 may also be referred to as an inverted index. In various implementations, the data intake and query system can use index files for other purposes, such as to store data summarizations that can be used to accelerate searches.

A bucket 1144 includes event data for a particular range of time. The indexing module 1136 arranges buckets in the index 1138 according to the age of the buckets, such that buckets for more recent ranges of time are stored in short-term storage 1140 and buckets for less recent ranges of time are stored in long-term storage 1142. Short-term storage 1140 may be faster to access while long-term storage 1142 may be slower to access. Buckets may move from short-term storage 1140 to long-term storage 1142 according to a configurable data retention policy, which can indicate at what point in time a bucket is old enough to be moved.

A bucket's location in short-term storage 1140 or long-term storage 1142 can also be indicated by the bucket's status. As an example, a bucket's status can be "hot," "warm," "cold," "frozen," or "thawed." In this example, hot bucket is one to which the indexer 1132 is writing data and the bucket becomes a warm bucket when the index 1132 stops writing data to it. In this example, both hot and warm buckets reside in short-term storage 1140. Continuing this example, when a warm bucket is moved to long-term storage 1142, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1120 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each bucket must exist within the cluster), and indexers to which buckets are copied may be selected to optimize distribution of data across the cluster.

A user can view the performance of the indexing system 1120 through the monitoring console 1116 provided by the user interface system 1114. Using the monitoring console 1116, the user can configure and monitor an index cluster, and see information such as disk usage by an index, volume usage by an indexer, index and volume size over time, data age, statistics for bucket types, and bucket settings, among other information.

Figure 12:
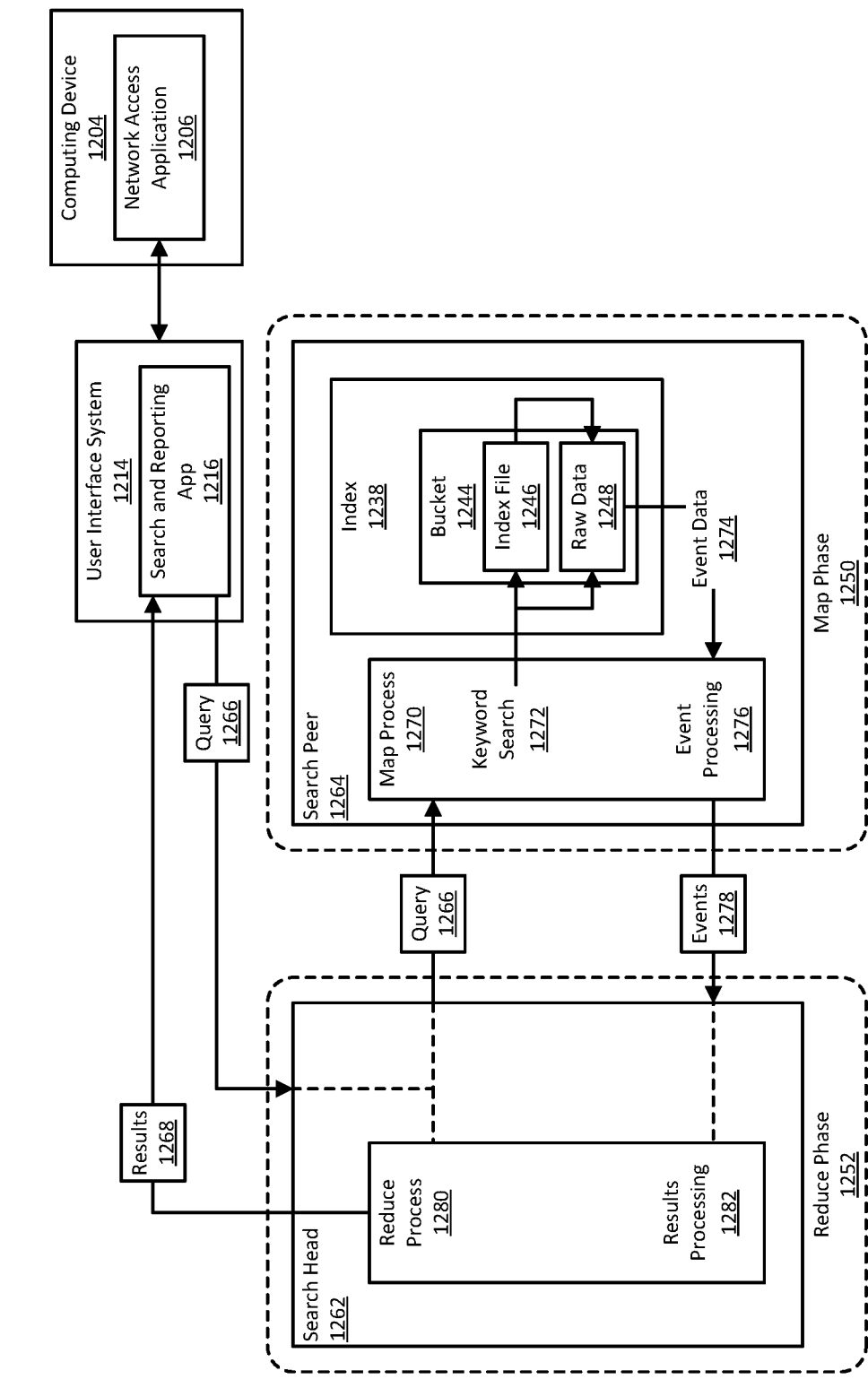
FIG. 12 is a block diagram illustrating an example computer system that may be used in some embodiments.

FIG. 12 is a block diagram illustrating in greater detail an example of the search system 1260 of a data intake and query system, such as the data intake and query system 1010 of FIG. 10. The search system 1260 of FIG. 12 issues a query 1266 to a search head 1262, which sends the query 1266 to a search peer 1264. Using a map process 1270, the search peer 1264 searches the appropriate index 1238 for events identified by the query 1266 and sends events 1278 so identified back to the search head 1262. Using a reduce process 1282, the search head 1262 processes the events 1278 and produces results 1268 to respond to the query 1266. The results 1268 can provide useful insights about the data stored in the index 1238. These insights can aid in the administration of information technology systems, in security analysis of information technology systems, and/or in analysis of the development environment provided by information technology systems.

The query 1266 that initiates a search is produced by a search and reporting app 1216 that is available through the user interface system 1214 of the data intake and query system. Using a network access application 1206 executing on a computing device 1204, a user can input the query 1266 into a search field provided by the search and reporting app 1216. Alternatively or additionally, the search and reporting app 1216 can include pre-configured queries or stored queries that can be activated by the user. In some cases, the search and reporting app 1216 initiates the query 1266 when the user enters the query 1266. In these cases, the query 1266 maybe referred to as an "ad-hoc" query. In some cases, the search and reporting app 1216 initiates the query 1266 based on a schedule. For example, the search and reporting app 1216 can be configured to execute the query 1266 once per hour, once per day, at a specific time, on a specific date, or at some other time that can be specified by a date, time, and/or frequency. These types of queries maybe referred to as scheduled queries.

The query 1266 is specified using a search processing language. The search processing language includes commands that the search peer 1264 will use to identify events to return in the search results 1268. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1266 to include sequential commands, where a subsequent command may operate on the results of a prior command. As an example, sequential commands may be separated in the query 1266 by a vertical line ("|" or "pipe") symbol.

In addition to one or more search commands, the query 1266 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1266 occurs in two broad phases: a map phase 1250 and a reduce phase 1252. The map phase 1250 takes place across one or more search peers. In the map phase 1250, the search peers locate event data that matches the search terms in the search query 1266 and sorts the event data into field-value pairs. When the map phase 1250 is complete, the search peers send events that they have found to one or more search heads for the reduce phase 1252. During the reduce phase 1252, the search heads process the events through commands in the search query 1266 and aggregate the events to produce the final search results 1268.

A search head, such as the search head 1262 illustrated in FIG. 12, is a component of the search system 1260 that manages searches. The search head 1262, which may also be referred to herein as a search management component, can be implemented using program code that can be executed on a computing device. The program code for the search head 1262 can be stored on a non-transitory computer-readable medium and from this medium can be loaded or copied to the memory of a computing device. One or more hardware processors of the computing device can read the program code from the memory and execute the program code in order to implement the operations of the search head 1262.

Upon receiving the search query 1266, the search head 1262 directs the query 1266 to one or more search peers, such as the search peer 1264 illustrated in FIG. 12. "Search peer" is an alternate name for "indexer" and a search peer may be largely similar to the indexer described previously. The search peer 1264 may be referred to as a "peer node" when the search peer 1264 is part of an indexer cluster. The search peer 1264, which may also be referred to as a search execution component, can be implemented using program code that can be executed on a computing device. In some implementations, one set of program code implements both the search head 1262 and the search peer 1264 such that the search head 1262 and the search peer 1264 form one component. In some implementations, the search head 1262 is an independent piece of code that performs searching and no indexing functionality. In these implementations, the search head 1262 may be referred to as a dedicated search head.

The search head 1262 may consider multiple criteria when determining whether to send the query 1266 to the particular search peer 1264. For example, the search system 1260 may be configured to include multiple search peers that each have duplicative copies of at least some of the event data. In this example, sending the search query 1266 to more than one search peer allows the search system 1260 to distribute the search workload across different hardware resources. As another example, search system 1260 may include different search peers for different purposes (e.g., one has an index storing a first type of data or from a first data source while a second has an index storing a second type of data or from a second data source). In this example, the search query 1266 may specify which indexes to search, and the search head 1262 will send the query 1266 to the search peers that have those indexes.

To identify events 1278 to send back to the search head 1262, the search peer 1264 performs a map process 1270 to obtain event data 1274 from the index 1238 that is maintained by the search peer 1264. During a first phase of the map process 1270, the search peer 1264 identifies buckets that have events that are described by the time indicator in the search query 1266. As noted above, a bucket contains events whose timestamps fall within a particular range of time. For each bucket 1244 whose events can be described by the time indicator, during a second phase of the map process 1270, the search peer 1264 performs a keyword search 1272 using search terms specified in the search query 1266. The search terms can be one or more of keywords, phrases, fields, Boolean expressions, and/or comparison expressions that in combination describe events being searched for. When segmentation is enabled at index time, the search peer 1264 performs the keyword search 1272 on the bucket's index file 1246. As noted previously, the index file 1246 includes a lexicon of the searchable terms in the events stored in the bucket's raw data 1248 file. The keyword search 1272 searches the lexicon for searchable terms that correspond to one or more of the search terms in the query 1266. As also noted above, the lexicon includes, for each searchable term, a reference to each location in the raw data 1248 file where the searchable term can be found. Thus, when the keyword search identifies a searchable term in the index file 1246 that matches query 1266, the search peer 1264 can use the location references to extract from the raw data 1248 file the event data 1274 for each event that include the searchable term.

In cases where segmentation was disabled at index time, the search peer 1264 performs the keyword search 1272 directly on the raw data 1248 file. To search the raw data 1248, the search peer 1264 may identify searchable segments in events in a similar manner as when the data was indexed. Thus, depending on how the search peer 1264 is configured, the search peer 1264 may look at event fields and/or parts of event fields to determine whether an event matches the query 1266. Any matching events can be added to the event data 1274 read from the raw data 1248 file. The search peer 1264 can further be configured to enable segmentation at search time, so that searching of the index 1238 causes the search peer 1264 to build a lexicon in the index file 1246.

The event data 1274 obtained from the raw data 1248 file includes the full text of each event found by the keyword search 1272. During a third phase of the map process 1270, the search peer 1264 performs event processing 1276 on the event data 1274, with the steps performed being determined by the configuration of the search peer 1264 and/or commands in the search query 1266. For example, the search peer 1264 can be configured to perform field discovery and field extraction. Field discovery is a process by which the search peer 1264 identifies and extracts key-value pairs from the events in the event data 1274. The search peer 1264 can, for example, be configured to automatically extract the first 100 fields (or another number of fields) in the event data 1274 that can be identified as key-value pairs. As another example, the search peer 1264 can extract any fields explicitly mentioned in the search query 1266. The search peer 1264 can, alternatively or additionally, be configured with particular field extractions to perform.

Other examples of steps that can be performed during event processing 1276 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1264 sends processed events 1278 to the search head 1262, which performs a reduce process 1280. The reduce process 1280 potentially receives events from multiple search peers and performs various results processing 1282 steps on the events. The results processing 1282 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 1282 can further include applying commands from the search query 1266 to the events. The query 1266 can include, for example, commands for evaluating and/or manipulating fields (e.g., to generate new fields from existing fields or parse fields that have more than one value). As another example, the query 1266 can include commands for calculating statistics over the events, such as counts of the occurrences of fields, or sums, averages, ranges, and so on, of field values. As another example, the query 1266 can include commands for generating statistical values for purposes of generating charts of graphs of the events.

Through results processing 1282, the reduce process 1280 produces the events found by processing the search query 1266, as well as some information about the events, which the search head 1262 outputs to the search and reporting app 1216 as search results 1268. The search and reporting app 1216 can generate visual interfaces for viewing the search results 1268. The search and reporting app 1216 can, for example, output visual interfaces for the network access application 1206 running on a computing device 1204 to generate.

The visual interfaces can include various visualizations of the search results 1268, such as tables, line or area charts, Chloropleth maps, or single values. The search and reporting app 1216 can organize the visualizations into a dashboard, where the dashboard includes a panel for each visualization.

A dashboard can thus include, for example, a panel listing the raw event data for the events in the search results 1268, a panel listing fields extracted at index time and/or found through field discovery along with statistics for those fields, and/or a timeline chart indicating how many events occurred at specific points in time (as indicated by the timestamps associated with each event). In various implementations, the search and reporting app 1216 can provide one or more default dashboards. Alternatively or additionally, the search and reporting app 1216 can include functionality that enables a user to configure custom dashboards.

The search and reporting app 1216 can also enable further investigation into the events in the search results 1268. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1266. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   receiving, by a visual playbook editor interface of a security, orchestration, and automated response (SOAR) service, a request to add an action block to a playbook under development in the visual playbook editor interface, wherein the action block identifies an action to be performed by the SOAR service upon encountering the action block during execution of the playbook, and wherein the action is implemented in part by an app providing a client interface to an application programming interface (API) for a device or service related to the SOAR service;
   identifying, based on data describing actions provided by the app, an input parameter associated with the action block, wherein the data indicates that the input parameter is one of: an array representing an ordered collection of values, or an object representing an unordered collection of name-value pairs;
   causing display, in the visual playbook editor interface, of one or more graphical interface elements corresponding to the input parameter;
   receiving, via the one or more graphical interface elements, one or more input values for the input parameter;
   generating a representation of the one or more input values according to a data interchange format; and providing, to the app, the representation of the one or more input values.

2. The method of claim 1, wherein the data describing the actions provided by the app is generated by an app generator service based on an API specification for the device or service.

3. The method of claim 1, wherein the input parameter is an array, and wherein the method further comprises:
receiving, via the visual playbook editor interface, input requesting to increase a number of graphical interface elements displayed for providing input parameter values; and
causing display of an additional graphical interface element for providing input parameter values.

4. The method of claim 1, wherein the input parameter is an object representing an unordered collection of name-value pairs, wherein the visual playbook editor interface includes a first graphical interface element representing the object, and wherein the method further comprises:
receiving, via the visual playbook editor interface, input selecting the first graphical interface element representing the object;
causing display, in the visual playbook editor interface, of a second graphical interface element including input fields for providing values associated with name-value pairs of the unordered collection of name-value pairs represented by the object; and
receiving, via the input fields, values for the name-value pairs of the unordered collection of name-value pairs represented by the object.

5. The method of claim 1, wherein the input parameter is an array representing an ordered collection of values, and wherein the ordered collection of values includes a plurality of objects.

6. The method of claim 1, wherein the input parameter is an object, and wherein the object includes an array of values.

7. The method of claim 1, wherein the input parameter is a first object representing a first unordered collection of name-value pairs, wherein the first object includes a second object, and wherein the second object includes a second unordered collection of name-value pairs.

8. The method of claim 1, wherein the input parameter is an array, and wherein a value in the array is one of: a string, a number, a Boolean, or a null value.

9. The method of claim 1, wherein the input parameter is a first input parameter, and wherein the method further comprises obtaining, by the SOAR service, an enumerated list of values from the device or service for a second input parameter, wherein the enumerated list of values is obtained via an endpoint defined by the app.

10. The method of claim 1, further comprising sending, by the app, a request to the device or service to execute the action, wherein the request includes the representation of the one or more input values.

11. A computing device, comprising:
a processor; and
a non-transitory computer-readable medium having stored thereon instructions that, when executed by the processor, cause the processor to perform operations including:
receiving, by a visual playbook editor interface of a security, orchestration, and automated response (SOAR) service, a request to add an action block to a playbook under development in the visual playbook editor interface, wherein the action block identifies an action to be performed by the SOAR service upon encountering the action block during execution of the playbook, and wherein the action is implemented in part by an app providing a client interface to an application programming interface (API) for a device or service related to the SOAR service;
identifying, based on data describing actions provided by the app, an input parameter associated with the action block, wherein the data indicates that the input parameter is one of: an array representing an ordered collection of values, or an object representing an unordered collection of name-value pairs;
causing display, in the visual playbook editor interface, of one or more graphical interface elements corresponding to the input parameter;
receiving, via the one or more graphical interface elements, one or more input values for the input parameter;
generating a representation of the one or more input values according to a data interchange format; and
providing, to the app, the representation of the one or more input values.

12. The computing device of claim 11, wherein the data describing the actions provided by the app is generated by an app generator service based on an API specification for the device or service.

13. The computing device of claim 11, wherein the input parameter is an array, and wherein the instructions, when executed by the processor, further cause the processor to perform operations including:
receiving, via the visual playbook editor interface, input requesting to increase a number of graphical interface elements displayed for providing input parameter values; and
causing display of an additional graphical interface element for providing input parameter values.

14. The computing device of claim 11, wherein the input parameter is an object representing an unordered collection of name-value pairs, wherein the visual playbook editor interface includes a first graphical interface element representing the object, and wherein the instructions, when executed by the processor, further cause the processor to perform operations including:
receiving, via the visual playbook editor interface, input selecting the first graphical interface element representing the object;
causing display, in the visual playbook editor interface, of a second graphical interface element including input fields for providing values associated with name-value pairs of the unordered collection of name-value pairs represented by the object; and
receiving, via the input fields, values for the name-value pairs of the unordered collection of name-value pairs represented by the object.

15. The computing device of claim 11, wherein the input parameter is an array representing an ordered collection of values, and wherein the ordered collection of values includes a plurality of objects.

16. A non-transitory computer-readable medium having stored thereon instructions that, when executed by one or more processors, cause the one or more processors to perform operations including:
receiving, by a visual playbook editor interface of a security, orchestration, and automated response (SOAR) service, a request to add an action block to a playbook under development in the visual playbook editor interface, wherein the action block identifies an action to be performed by the SOAR service upon encountering the action block during execution of the playbook, and wherein the action is implemented in part by an app providing a client interface to an application programming interface (API) for a device or service related to the SOAR service;

identifying, based on data describing actions provided by the app, an input parameter associated with the action block, wherein the data indicates that the input parameter is one of: an array representing an ordered collection of values, or an object representing an unordered collection of name-value pairs;

causing display, in the visual playbook editor interface, of one or more graphical interface elements corresponding to the input parameter;

receiving, via the one or more graphical interface elements, one or more input values for the input parameter;

generating a representation of the one or more input values according to a data interchange format; and providing, to the app, the representation of the one or more input values.

17. The non-transitory computer-readable medium of claim 16, wherein the data describing the actions provided by the app is generated by an app generator service based on an API specification for the device or service.

18. The non-transitory computer-readable medium of claim 16, wherein the input parameter is an array, and wherein the instructions, when executed by one or more processors, cause the one or more processors to perform operations including:

receiving, via the visual playbook editor interface, input requesting to increase a number of graphical interface elements displayed for providing input parameter values; and causing display of an additional graphical interface element for providing input parameter values.

19. The non-transitory computer-readable medium of claim 16, wherein the input parameter is an object representing an unordered collection of name-value pairs, wherein the visual playbook editor interface includes a first graphical interface element representing the object, and wherein the instructions, when executed by one or more processors, further cause the one or more processors to perform operations including:

receiving, via the visual playbook editor interface, input selecting the first graphical interface element representing the object;

causing display, in the visual playbook editor interface, of a second graphical interface element including input fields for providing values associated with name-value pairs of the unordered collection of name-value pairs represented by the object; and receiving, via the input fields, values for the name-value pairs of the unordered collection of name-value pairs represented by the object.

20. The non-transitory computer-readable medium of claim 16, wherein the input parameter is an array representing an ordered collection of values, and wherein the ordered collection of values includes a plurality of objects.

* * * * *